(12) United States Patent
Lemay et al.

(10) Patent No.: US 9,933,937 B2
(45) Date of Patent: Apr. 3, 2018

(54) PORTABLE MULTIFUNCTION DEVICE, METHOD, AND GRAPHICAL USER INTERFACE FOR PLAYING ONLINE VIDEOS

(75) Inventors: Stephen O. Lemay, San Francisco, CA (US); Michael Matas, Palo Alto, CA (US); Timothy P. Omernick, Mountain View, CA (US); Richard Williamson, Los Gatos, CA (US); Imran Chaudhri, San Francisco, CA (US); Charles J. Pisula, San Jose, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 2206 days.

(21) Appl. No.: 11/968,067

(22) Filed: Dec. 31, 2007

(65) Prior Publication Data

US 2008/0320391 A1    Dec. 25, 2008

Related U.S. Application Data

(60) Provisional application No. 60/937,993, filed on Jun. 29, 2007, provisional application No. 60/936,562, filed on Jun. 20, 2007.

(51) Int. Cl.
 *G06F 3/14* (2006.01)
 *G06F 3/0488* (2013.01)
(52) U.S. Cl.
 CPC ................ *G06F 3/04886* (2013.01)
(58) Field of Classification Search
 CPC ..................................... G06F 3/14; G06F 3/17
 (Continued)

(56) References Cited

U.S. PATENT DOCUMENTS

| 4,313,108 A | 1/1982 | Yoshida |
| 5,146,556 A | 9/1992 | Hullot et al. |

(Continued)

FOREIGN PATENT DOCUMENTS

| CA | 2349649 A1 | 1/2002 |
| CN | 1257247 A | 6/2000 |

(Continued)

OTHER PUBLICATIONS

International Search Report and Written Opinion for International Application No. PCT/US2008/050430, mailed Sep. 1, 2008.

(Continued)

*Primary Examiner* — Ruay Ho
(74) *Attorney, Agent, or Firm* — Dentons US LLP

(57) ABSTRACT

A portable electronic device with a touch screen display displays a first list of information about online video items in a plurality of lists. The device displays a plurality of icons corresponding to at least some of the plurality of lists. In response to detecting a moving finger gesture on the first list, the device scrolls the first list. In response to detecting a stationary finger gesture on a first portion of a row in the first list, where the row contains information about a particular online video item, the device: initiates a request for the particular online video item from a remote computer, receives the particular online video item, and plays the particular online video item. In response to detecting a finger gesture on a respective icon in the plurality of icons, the device displays a corresponding list of information about online video items.

32 Claims, 22 Drawing Sheets

(58) Field of Classification Search
USPC ......... 715/200–277, 700–867; 700/701–866; 709/201–229; 705/50–79; 345/30–111, 345/173, 660; 707/1–10, 100–104.1, 707/200–206, 722; 370/252
See application file for complete search history.

(56) References Cited

U.S. PATENT DOCUMENTS

| | | | |
|---|---|---|---|
| 5,196,838 A | 3/1993 | Meier et al. | |
| 5,303,388 A | 4/1994 | Kreitman et al. | |
| 5,345,543 A | 9/1994 | Capps et al. | |
| 5,396,590 A | 3/1995 | Kreegar | |
| 5,446,882 A | 8/1995 | Capps et al. | |
| 5,452,414 A | 9/1995 | Rosendahl et al. | |
| 5,463,725 A | 10/1995 | Henckel et al. | |
| 5,491,778 A | 2/1996 | Gordon et al. | |
| 5,541,697 A | 7/1996 | McIntyre | |
| 5,570,109 A | 10/1996 | Jenson | |
| 5,610,653 A | 3/1997 | Abecassis | 348/110 |
| 5,644,739 A | 7/1997 | Moursund | |
| 5,657,049 A | 8/1997 | Ludolph et al. | |
| 5,659,805 A | 8/1997 | Furlani et al. | |
| 5,726,687 A | 3/1998 | Belfiore et al. | |
| 5,745,096 A | 4/1998 | Ludolph et al. | |
| 5,745,910 A | 4/1998 | Piersol et al. | |
| 5,754,179 A | 5/1998 | Hocker et al. | |
| 5,757,371 A | 5/1998 | Oran et al. | |
| 5,760,773 A | 6/1998 | Berman et al. | 345/347 |
| 5,796,401 A | 8/1998 | Winer | |
| 5,812,862 A | 9/1998 | Smith et al. | |
| 5,825,349 A | 10/1998 | Meier et al. | |
| 5,825,357 A | 10/1998 | Malamud et al. | |
| 5,838,326 A | 11/1998 | Card et al. | |
| 5,864,868 A | 1/1999 | Contois | |
| 5,877,765 A | 3/1999 | Dickman et al. | |
| 5,880,733 A | 3/1999 | Horvitz et al. | |
| 5,896,133 A | 4/1999 | Lynch et al. | |
| 5,900,909 A | 5/1999 | Parulski et al. | |
| 5,914,716 A | 6/1999 | Rubin et al. | |
| 5,914,717 A | 6/1999 | Kleewein et al. | |
| 5,923,327 A | 7/1999 | Smith et al. | |
| 5,995,106 A | 11/1999 | Naughton et al. | |
| 6,006,227 A | 12/1999 | Freeman et al. | |
| 6,011,585 A | 1/2000 | Anderson | |
| 6,023,275 A | 2/2000 | Horvitz et al. | |
| 6,040,824 A | 3/2000 | Maekawa et al. | |
| 6,043,818 A | 3/2000 | Nakano et al. | |
| 6,049,336 A | 4/2000 | Liu et al. | |
| 6,072,486 A | 6/2000 | Sheldon et al. | |
| 6,073,036 A | 6/2000 | Heikkinen et al. | |
| 6,111,573 A | 8/2000 | McComb et al. | |
| 6,133,914 A | 10/2000 | Rogers et al. | |
| 6,133,916 A | 10/2000 | Bukszar et al. | |
| 6,144,863 A | 11/2000 | Charron | |
| 6,177,936 B1 | 1/2001 | Cragun | |
| 6,195,094 B1 | 2/2001 | Celebiler | |
| 6,199,082 B1 | 3/2001 | Ferrel et al. | |
| 6,229,542 B1 | 5/2001 | Miller | |
| 6,275,935 B1 | 8/2001 | Barlow et al. | |
| 6,278,454 B1 | 8/2001 | Krishnan | |
| 6,297,795 B1 | 10/2001 | Kato et al. | 345/123 |
| 6,313,853 B1 | 11/2001 | Lamontagne et al. | |
| 6,317,140 B1 | 11/2001 | Livingston | |
| 6,326,970 B1 | 12/2001 | Mott et al. | |
| 6,346,951 B1 | 2/2002 | Mastronardi | |
| 6,349,410 B1 | 2/2002 | Lortz | |
| 6,353,451 B1 | 3/2002 | Teibel et al. | |
| 6,359,615 B1 | 3/2002 | Singh | |
| 6,377,698 B1 | 4/2002 | Cumoli et al. | |
| 6,388,877 B1 | 5/2002 | Canova, Jr. et al. | |
| 6,396,520 B1 | 5/2002 | Ording | |
| 6,411,283 B1 | 6/2002 | Murphy | |
| 6,433,801 B1 | 8/2002 | Moon et al. | |
| 6,466,198 B1 | 10/2002 | Feinstein | |
| 6,466,203 B2 | 10/2002 | Van Ee | |
| 6,486,895 B1 | 11/2002 | Robertson et al. | |
| 6,489,951 B1 | 12/2002 | Wong et al. | |
| 6,496,182 B1 | 12/2002 | Wong et al. | 345/173 |
| 6,545,669 B1 | 4/2003 | Kinawi et al. | |
| 6,570,557 B1 | 5/2003 | Westerman et al. | |
| 6,570,583 B1 | 5/2003 | Kung et al. | |
| 6,577,330 B1 | 6/2003 | Tsuda et al. | |
| 6,590,568 B1 | 7/2003 | Astala et al. | 345/173 |
| 6,638,313 B1 | 10/2003 | Freeman et al. | |
| 6,639,584 B1 | 10/2003 | Li | |
| 6,677,932 B1 | 1/2004 | Westerman | |
| 6,724,403 B1 | 4/2004 | Santoro et al. | |
| 6,725,427 B2 | 4/2004 | Freeman et al. | |
| 6,763,388 B1 | 7/2004 | Tsimelzon | |
| 6,768,999 B2 | 7/2004 | Prager et al. | |
| 6,771,250 B1 | 8/2004 | Oh | |
| 6,781,575 B1 | 8/2004 | Hawkins et al. | |
| 6,919,879 B2 | 7/2005 | Griffin et al. | |
| 6,928,461 B2 | 8/2005 | Tuli | |
| 6,931,601 B2 | 8/2005 | Vronay et al. | |
| 6,934,911 B2 | 8/2005 | Salmimaa et al. | |
| 6,956,564 B1 | 10/2005 | Williams | 345/179 |
| 6,970,749 B1 | 11/2005 | Chinn et al. | |
| 6,975,306 B2 | 12/2005 | Hinckley et al. | |
| 6,976,210 B1 | 12/2005 | Silva et al. | |
| 6,978,127 B1 | 12/2005 | Bulthuis et al. | |
| 7,007,239 B1 | 2/2006 | Hawkins et al. | |
| 7,030,861 B1 | 4/2006 | Westerman et al. | |
| 7,054,965 B2 | 5/2006 | Bell et al. | |
| 7,071,943 B2 | 7/2006 | Adler | |
| 7,075,512 B1 | 7/2006 | Fabre et al. | |
| 7,085,590 B2 | 8/2006 | Kennedy et al. | 455/556.1 |
| 7,093,201 B2 | 8/2006 | Duarte | |
| 7,134,095 B1 | 11/2006 | Smith et al. | |
| 7,149,549 B1 | 12/2006 | Ortiz et al. | |
| 7,166,791 B2 | 1/2007 | Robbin et al. | |
| 7,171,625 B1 | 1/2007 | Sacchi | |
| 7,231,229 B1 | 6/2007 | Hawkins et al. | |
| 7,283,845 B2 | 10/2007 | De Bast | |
| 7,355,593 B2 | 4/2008 | Hill et al. | |
| 7,362,331 B2 | 4/2008 | Ording | |
| 7,432,928 B2 | 10/2008 | Shaw et al. | |
| 7,434,177 B1 | 10/2008 | Ording et al. | |
| 7,437,005 B2 | 10/2008 | Drucker et al. | |
| 7,461,353 B2 | 12/2008 | Rohrabaugh et al. | |
| 7,479,949 B2 * | 1/2009 | Jobs et al. | 345/173 |
| 7,480,870 B2 * | 1/2009 | Anzures et al. | 715/772 |
| 7,487,467 B1 | 2/2009 | Kawahara et al. | |
| 7,490,295 B2 | 2/2009 | Chaudhri et al. | |
| 7,492,350 B2 | 2/2009 | Fabre et al. | |
| 7,493,573 B2 | 2/2009 | Wagner | |
| 7,506,268 B2 | 3/2009 | Jennings et al. | |
| 7,509,588 B2 * | 3/2009 | Van Os et al. | 715/835 |
| 7,512,898 B2 | 3/2009 | Jennings et al. | |
| 7,526,738 B2 | 4/2009 | Ording et al. | |
| 7,546,548 B2 | 6/2009 | Chew et al. | |
| 7,546,554 B2 | 6/2009 | Chiu et al. | |
| 7,561,874 B2 | 7/2009 | Wang et al. | |
| 7,581,186 B2 | 8/2009 | Dowdy et al. | |
| 7,587,671 B2 | 9/2009 | Saft et al. | 715/253 |
| 7,596,761 B2 * | 9/2009 | Lemay et al. | 715/779 |
| 7,614,008 B2 | 11/2009 | Ording | |
| 7,624,357 B2 | 11/2009 | De Bast | |
| 7,633,076 B2 | 12/2009 | Huppi et al. | |
| 7,642,934 B2 | 1/2010 | Scott | |
| 7,650,137 B2 | 1/2010 | Jobs et al. | |
| 7,653,883 B2 | 1/2010 | Hotelling et al. | |
| 7,656,393 B2 | 2/2010 | King et al. | |
| 7,657,849 B2 | 2/2010 | Chaudhri et al. | |
| 7,676,767 B2 | 3/2010 | Hofmeister et al. | |
| 7,679,604 B2 | 3/2010 | Uhlik et al. | |
| 7,683,889 B2 | 3/2010 | Ribikauskas et al. | |
| 7,694,231 B2 | 4/2010 | Kocienda et al. | |
| 7,710,393 B2 | 5/2010 | Tsuk et al. | |
| 7,719,542 B1 | 5/2010 | Gough et al. | |
| 7,730,401 B2 | 6/2010 | Gillespie et al. | |
| 7,735,021 B2 | 6/2010 | Padawer et al. | |
| 7,739,271 B2 * | 6/2010 | Cook et al. | 707/722 |
| 7,747,289 B2 | 6/2010 | Wang et al. | |

(56) References Cited

U.S. PATENT DOCUMENTS

| | | |
|---|---|---|
| 7,783,990 B2 | 8/2010 | Amadio et al. |
| 7,788,583 B1 | 8/2010 | Amzallag et al. |
| 7,805,684 B2 | 9/2010 | Arvilommi |
| 7,810,038 B2 | 10/2010 | Matsa et al. |
| 7,831,926 B2 | 11/2010 | Rohrabaugh et al. |
| 7,840,901 B2 | 11/2010 | Lacey et al. |
| 7,844,889 B2 | 11/2010 | Rohrabaugh et al. |
| 7,844,914 B2 | 11/2010 | Andre et al. |
| 7,853,972 B2 | 12/2010 | Brodersen et al. |
| 7,856,602 B2 | 12/2010 | Armstrong |
| 7,940,250 B2 | 5/2011 | Forstall |
| 7,957,762 B2 | 6/2011 | Herz et al. |
| 7,958,457 B1 | 6/2011 | Brandenberg et al. |
| 7,996,792 B2 | 8/2011 | Anzures et al. |
| 8,006,002 B2 | 8/2011 | Kalayjian et al. |
| 8,155,505 B2 | 4/2012 | Lemay et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,519,964 B2 | 8/2013 | Platzer et al. |
| 8,736,561 B2 | 5/2014 | Anzures et al. |
| 9,367,232 B2 | 6/2016 | Platzer et al. |
| 2001/0015719 A1 | 8/2001 | Van Ee et al. |
| 2001/0024195 A1 | 9/2001 | Hayakawa |
| 2001/0024212 A1 | 9/2001 | Ohnishi |
| 2001/0050687 A1 | 12/2001 | Iida et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0021278 A1 | 2/2002 | Hinckley et al. |
| 2002/0024540 A1 | 2/2002 | McCarthy |
| 2002/0030699 A1 | 3/2002 | Van Ee |
| 2002/0038299 A1 | 3/2002 | Zernik et al. |
| 2002/0054090 A1 | 5/2002 | Silva et al. |
| 2002/0085037 A1 | 7/2002 | Leavitt et al. |
| 2002/0093531 A1 | 7/2002 | Barile ............... 345/753 |
| 2002/0113824 A1 | 8/2002 | Myers, Jr. |
| 2002/0152283 A1 | 10/2002 | Dutta et al. |
| 2002/0191029 A1 | 12/2002 | Gillespie et al. |
| 2002/0198909 A1 | 12/2002 | Huynh et al. |
| 2003/0013483 A1 | 1/2003 | Ausems et al. |
| 2003/0016241 A1 | 1/2003 | Burke |
| 2003/0025676 A1 | 2/2003 | Cappendijk ............. 345/173 |
| 2003/0030664 A1 | 2/2003 | Parry |
| 2003/0033331 A1 | 2/2003 | Sena et al. |
| 2003/0048295 A1 | 3/2003 | Lilleness et al. |
| 2003/0063125 A1 | 4/2003 | Miyajima et al. |
| 2003/0090572 A1 | 5/2003 | Belz et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0122787 A1 | 7/2003 | Zimmerman et al. |
| 2003/0164861 A1 | 9/2003 | Barbanson et al. |
| 2003/0169298 A1 | 9/2003 | Ording |
| 2003/0184552 A1 | 10/2003 | Chadha |
| 2003/0184587 A1 | 10/2003 | Ording et al. |
| 2003/0200289 A1 | 10/2003 | Kemp et al. |
| 2003/0206195 A1 | 11/2003 | Matsa et al. |
| 2003/0206197 A1 | 11/2003 | McInerney |
| 2004/0013416 A1 | 1/2004 | Mok |
| 2004/0027396 A1 | 2/2004 | Lection |
| 2004/0055446 A1 | 3/2004 | Robbin et al. |
| 2004/0100479 A1 | 5/2004 | Nakano et al. |
| 2004/0103156 A1 | 5/2004 | Quillen et al. |
| 2004/0109025 A1 | 6/2004 | Hullot et al. |
| 2004/0121823 A1 | 6/2004 | Noesgaard et al. |
| 2004/0122683 A1 | 6/2004 | Grossman et al. |
| 2004/0143590 A1 | 7/2004 | Wong et al. |
| 2004/0143796 A1 | 7/2004 | Lerner et al. |
| 2004/0155909 A1 | 8/2004 | Wagner |
| 2004/0167783 A1 | 8/2004 | Nagai |
| 2004/0169674 A1 | 9/2004 | Linjama |
| 2004/0177148 A1 | 9/2004 | Tsimelzon, Jr. |
| 2004/0201595 A1 | 10/2004 | Manchester |
| 2004/0215534 A1 | 10/2004 | Gautier et al. |
| 2004/0215719 A1 | 10/2004 | Altshuler |
| 2004/0222975 A1 | 11/2004 | Nakano et al. |
| 2004/0235520 A1 | 11/2004 | Cadiz et al. |
| 2004/0250217 A1 | 12/2004 | Tojo et al. |
| 2004/0268400 A1 | 12/2004 | Barde et al. |
| 2005/0005246 A1 | 1/2005 | Card et al. |
| 2005/0012723 A1 | 1/2005 | Pallakoff |
| 2005/0020317 A1 | 1/2005 | Koyama ............... 455/566 |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0044509 A1 | 2/2005 | Hunleth et al. ............. 715/834 |
| 2005/0057524 A1 | 3/2005 | Hill et al. |
| 2005/0057548 A1 | 3/2005 | Kim |
| 2005/0060664 A1 | 3/2005 | Rogers |
| 2005/0060665 A1 | 3/2005 | Rekimoto |
| 2005/0071736 A1* | 3/2005 | Schneider et al. ............. 715/500 |
| 2005/0071778 A1 | 3/2005 | Tokkonen |
| 2005/0079896 A1 | 4/2005 | Kokko et al. |
| 2005/0091596 A1 | 4/2005 | Anthony et al. |
| 2005/0091609 A1 | 4/2005 | Matthews et al. |
| 2005/0093826 A1 | 5/2005 | Huh |
| 2005/0097089 A1 | 5/2005 | Nielsen et al. |
| 2005/0110768 A1 | 5/2005 | Marriott et al. |
| 2005/0120142 A1 | 6/2005 | Hall |
| 2005/0134578 A1 | 6/2005 | Chambers et al. |
| 2005/0154798 A1 | 7/2005 | Nurmi |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0190059 A1 | 9/2005 | Wehrenberg |
| 2005/0204385 A1* | 9/2005 | Sull et al. ............... 725/45 |
| 2005/0229102 A1 | 10/2005 | Watson et al. |
| 2005/0229118 A1 | 10/2005 | Chiu et al. |
| 2005/0240494 A1 | 10/2005 | Cue et al. |
| 2005/0240756 A1 | 10/2005 | Mayer |
| 2005/0243069 A1 | 11/2005 | Yorio et al. |
| 2005/0250438 A1 | 11/2005 | Makipaa et al. |
| 2005/0251755 A1 | 11/2005 | Mullins et al. |
| 2005/0262448 A1 | 11/2005 | Vronay et al. |
| 2005/0270276 A1 | 12/2005 | Sugimoto et al. |
| 2005/0275636 A1 | 12/2005 | Dehlin et al. |
| 2005/0283729 A1 | 12/2005 | Morris et al. |
| 2005/0285880 A1 | 12/2005 | Lai et al. |
| 2005/0289476 A1 | 12/2005 | Tokkonen |
| 2006/0017692 A1 | 1/2006 | Wehrenberg et al. ........ 345/156 |
| 2006/0026521 A1 | 2/2006 | Hotelling et al. ............. 715/702 |
| 2006/0026535 A1 | 2/2006 | Hotelling et al. |
| 2006/0033724 A1 | 2/2006 | Chaudhri et al. |
| 2006/0033761 A1 | 2/2006 | Suen et al. |
| 2006/0051073 A1 | 3/2006 | Jung et al. |
| 2006/0053387 A1 | 3/2006 | Ording |
| 2006/0055662 A1 | 3/2006 | Rimas-Ribikauskas et al. |
| 2006/0064647 A1 | 3/2006 | Tapuska et al. |
| 2006/0075355 A1 | 4/2006 | Shiono et al. |
| 2006/0080616 A1 | 4/2006 | Vogel et al. |
| 2006/0085743 A1 | 4/2006 | Baudisch et al. |
| 2006/0085763 A1 | 4/2006 | Leavitt et al. |
| 2006/0097991 A1 | 5/2006 | Hotelling et al. |
| 2006/0101354 A1 | 5/2006 | Hashimoto et al. |
| 2006/0112335 A1 | 5/2006 | Hofmeister et al. |
| 2006/0123360 A1 | 6/2006 | Anwar et al. |
| 2006/0132460 A1 | 6/2006 | Kolmykov-Zotov et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0153531 A1 | 7/2006 | Kanegae et al. |
| 2006/0174211 A1 | 8/2006 | Hoellerer et al. |
| 2006/0195789 A1 | 8/2006 | Rogers et al. |
| 2006/0195790 A1 | 8/2006 | Beaupre et al. |
| 2006/0197753 A1 | 9/2006 | Hotelling |
| 2006/0236266 A1 | 10/2006 | Majava |
| 2006/0238625 A1 | 10/2006 | Sasaki et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0246955 A1 | 11/2006 | Nirhamo et al. |
| 2006/0265643 A1 | 11/2006 | Saft et al. |

(56) References Cited

U.S. PATENT DOCUMENTS

| | | |
|---|---|---|
| 2006/0271864 A1 | 11/2006 | Satterfield et al. |
| 2006/0271874 A1 | 11/2006 | Raiz et al. |
| 2006/0277460 A1 | 12/2006 | Forstall et al. |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0290661 A1 | 12/2006 | Innanen et al. |
| 2007/0004451 A1 | 1/2007 | Anderson .................. 455/556.1 |
| 2007/0013665 A1 | 1/2007 | Vetelainen et al. |
| 2007/0024646 A1* | 2/2007 | Saarinen et al. ............. 345/660 |
| 2007/0028269 A1 | 2/2007 | Nezu et al. |
| 2007/0030362 A1 | 2/2007 | Ota et al. |
| 2007/0033295 A1 | 2/2007 | Marriott |
| 2007/0038612 A1 | 2/2007 | Sull et al. |
| 2007/0044036 A1 | 2/2007 | Ishimura et al. |
| 2007/0053268 A1 | 3/2007 | Crandall et al. |
| 2007/0055947 A1 | 3/2007 | Ostojic et al. |
| 2007/0064619 A1* | 3/2007 | Bettis et al. .................. 370/252 |
| 2007/0067272 A1 | 3/2007 | Flynt et al. |
| 2007/0067738 A1 | 3/2007 | Flynt et al. |
| 2007/0070066 A1 | 3/2007 | Bakhash |
| 2007/0083911 A1 | 4/2007 | Madden et al. |
| 2007/0085759 A1 | 4/2007 | Lee et al. |
| 2007/0085841 A1 | 4/2007 | Tsuk et al. |
| 2007/0101297 A1 | 5/2007 | Forstall et al. |
| 2007/0106952 A1* | 5/2007 | Matas et al. .................. 715/764 |
| 2007/0124677 A1 | 5/2007 | de los Reyes et al. |
| 2007/0124680 A1 | 5/2007 | Robbin et al. |
| 2007/0150810 A1 | 6/2007 | Katz et al. |
| 2007/0150830 A1 | 6/2007 | Ording et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157089 A1 | 7/2007 | Van Os et al. |
| 2007/0157228 A1 | 7/2007 | Bayer et al. |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0192741 A1 | 8/2007 | Yoritate et al. |
| 2007/0243862 A1 | 10/2007 | Coskun et al. |
| 2007/0245250 A1 | 10/2007 | Schechter et al. |
| 2007/0263176 A1 | 11/2007 | Nozaki et al. |
| 2007/0266342 A1 | 11/2007 | Chang et al. |
| 2007/0288860 A1 | 12/2007 | Ording et al. |
| 2007/0288862 A1 | 12/2007 | Ording |
| 2008/0001924 A1 | 1/2008 | de los Reyes et al. |
| 2008/0005703 A1 | 1/2008 | Radivojevic et al. |
| 2008/0034309 A1 | 2/2008 | Louch et al. |
| 2008/0036743 A1 | 2/2008 | Westerman et al. |
| 2008/0042984 A1 | 2/2008 | Lim et al. |
| 2008/0055272 A1 | 3/2008 | Anzures et al. ............. 345/173 |
| 2008/0059888 A1 | 3/2008 | Dunko |
| 2008/0062137 A1 | 3/2008 | Brodersen et al. |
| 2008/0066016 A1 | 3/2008 | Dowdy et al. |
| 2008/0082930 A1 | 4/2008 | Omernick et al. |
| 2008/0122796 A1 | 5/2008 | Jobs et al. |
| 2008/0125180 A1 | 5/2008 | Hoffman et al. |
| 2008/0161045 A1 | 7/2008 | Vuorenmaa |
| 2008/0165144 A1 | 7/2008 | Forstall et al. |
| 2008/0165148 A1 | 7/2008 | Williamson et al. |
| 2008/0165152 A1 | 7/2008 | Forstall et al. |
| 2008/0165153 A1* | 7/2008 | Platzer et al. ............. 345/173 |
| 2008/0168367 A1 | 7/2008 | Chaudhri et al. |
| 2008/0168478 A1 | 7/2008 | Platzer et al. |
| 2008/0174570 A1* | 7/2008 | Jobs et al. .................... 345/173 |
| 2008/0182628 A1 | 7/2008 | Lee et al. |
| 2008/0184112 A1 | 7/2008 | Chiang et al. |
| 2008/0201452 A1 | 8/2008 | Athas et al. |
| 2008/0216017 A1 | 9/2008 | Kurtenbach et al. |
| 2008/0231610 A1 | 9/2008 | Hotelling et al. |
| 2008/0259045 A1 | 10/2008 | Kim et al. |
| 2009/0002335 A1 | 1/2009 | Chaudhri |
| 2009/0007017 A1 | 1/2009 | Anzures et al. |
| 2009/0024923 A1 | 1/2009 | Hartwig et al. |
| 2009/0064055 A1 | 3/2009 | Chaudhri et al. |
| 2009/0113475 A1 | 4/2009 | Li |
| 2009/0128581 A1 | 5/2009 | Brid et al. |
| 2009/0172532 A1 | 7/2009 | Chaudhri |
| 2009/0178008 A1 | 7/2009 | Herz et al. |
| 2009/0198359 A1 | 8/2009 | Chaudhri |
| 2009/0199128 A1 | 8/2009 | Matthews et al. |
| 2009/0207184 A1 | 8/2009 | Laine et al. |
| 2009/0304359 A1 | 12/2009 | Lemay et al. |
| 2010/0029327 A1 | 2/2010 | Jee |
| 2010/0095238 A1 | 4/2010 | Baudet |
| 2010/0100839 A1 | 4/2010 | Tseng et al. |
| 2010/0103321 A1 | 4/2010 | Ishikawa et al. |
| 2010/0105454 A1 | 4/2010 | Weber et al. |
| 2010/0318709 A1 | 12/2010 | Bell et al. |
| 2011/0007009 A1 | 1/2011 | Ishihara et al. |
| 2011/0050640 A1 | 3/2011 | Lundback et al. |
| 2011/0154390 A1 | 6/2011 | Smith |
| 2014/0372889 A1 | 12/2014 | Anzures et al. |
| 2016/0253065 A1 | 9/2016 | Platzer et al. |

FOREIGN PATENT DOCUMENTS

| | | | |
|---|---|---|---|
| CN | 1940833 A | 4/2007 | |
| CN | 1949905 A | 4/2007 | |
| CN | 101527745 A | 9/2009 | |
| CN | 101535938 A | 9/2009 | |
| EP | 0626635 A2 | 11/1994 | |
| EP | 0651544 A2 | 5/1995 | |
| EP | 0701220 A1 | 3/1996 | |
| EP | 0844553 A1 | 5/1998 | |
| EP | 1049305 A1 | 11/2000 | |
| EP | 1143334 A2 | 10/2001 | |
| EP | 1231763 A1 | 8/2002 | |
| EP | 1517228 A2 | 3/2005 | |
| EP | 1632874 A2 | 3/2006 | |
| EP | 1744242 A2 | 1/2007 | |
| EP | 1752880 A1 | 2/2007 | |
| FR | 2819675 A1 | 7/2002 | |
| GB | 2329813 A | 3/1999 | |
| GB | 2347593 A | 9/2000 | |
| JP | 9-73381 A | 3/1997 | |
| JP | 11143604 A | 5/1999 | |
| JP | 2000-105772 A | 4/2000 | |
| JP | 2000-163031 A | 6/2000 | |
| JP | 2000-181436 A | 6/2000 | |
| JP | 2002-149616 A | 5/2002 | |
| JP | 2004-070492 A | 3/2004 | |
| JP | 2004-164242 A | 6/2004 | |
| JP | 2004-341886 A | 12/2004 | |
| JP | 2005-267049 A | 9/2005 | |
| JP | 2005-309933 A | 11/2005 | |
| JP | 2005-352924 A | 12/2005 | |
| KR | 10-2002-0010863 A | 2/2002 | |
| WO | 99/28815 A1 | 6/1999 | |
| WO | 99/38149 A1 | 7/1999 | |
| WO | 9954807 A1 | 10/1999 | |
| WO | WO 00/08757 A1 | 2/2000 | ................ H03J 1/00 |
| WO | 01/23985 A1 | 4/2001 | |
| WO | 01/57716 A2 | 8/2001 | |
| WO | 01/79980 A1 | 10/2001 | |
| WO | 02/08881 A2 | 1/2002 | |
| WO | 02/13176 A2 | 2/2002 | |
| WO | 02/46903 A1 | 6/2002 | |
| WO | 02/093542 A1 | 11/2002 | |
| WO | 03/052626 A1 | 6/2003 | |
| WO | 2004/021166 A1 | 3/2004 | |
| WO | 2004/040481 A1 | 5/2004 | |
| WO | 2004/063862 A2 | 7/2004 | |
| WO | 2005/029308 A2 | 3/2005 | |
| WO | 2005/036416 A2 | 4/2005 | |
| WO | WO 2005/041020 | 5/2005 | ............. G06F 3/033 |
| WO | 2005/106684 A1 | 11/2005 | |
| WO | 2006/003591 A2 | 1/2006 | |
| WO | WO 2006/020304 A2 | 2/2006 | |
| WO | WO 2006/020305 A2 | 2/2006 | |
| WO | 2006/036069 A1 | 4/2006 | |
| WO | 2007/032972 A1 | 3/2007 | |

(56) References Cited

FOREIGN PATENT DOCUMENTS

| | | | |
|---|---|---|---|
| WO | 2007/069835 A1 | 6/2007 |
| WO | 2007/094894 A2 | 8/2007 |
| WO | 2008/030874 A1 | 3/2008 |
| WO | 2008/030879 A2 | 3/2008 |
| WO | 2008/030976 A2 | 3/2008 |
| WO | 2008/086303 A1 | 7/2008 |

OTHER PUBLICATIONS

Williams, M., "LG's Cell Phone Can Pause Live TV," PC World, Oct. 11, 2005.
International Search Report and Written Opinion for International Application PCT/US2007/077638, mailed Feb. 19, 2008.
Office Action dated Aug. 2, 2010, received in U.S. Appl. No. 11/850,008.
palmOne, "Your Mobile Manager," Chapter 2, LifeDrive™ User's Guide, © 2005 palmOne, 23 pages, http://www.palm.com/us/support/handbooks/lifedrive/en/lifedrive_handbook.pdf.
Tidwell, J., "Animated Transition," from Designing Interfaces, pp. 84-85, Copyright © 2006 O'Reilly Media, Inc.
Wikipedia, "History of YouTube," 2004-2009, downloaded Mar. 15, 2011, 4 pages, http://en.wikipedia.org/wiki/History_of_YouTube.
YouTube, "Broadcasting Ourselves;)," Nov. 15, 2005, 5 pages, http://youtube-global.blogspot.com/2005_11_01_archive.html.
YouTube, "Broadcast Yourself," 2 pages, www.youtube.com.
Final Office Action dated Dec. 29, 2010, in U.S. Appl. No. 11/850,008.
"Asus Eee News, Mods, and Hacks: Asus Eee PC Easy Mode Internet Tab Options Tour", asuseeehacks.blogspot.com, Online Available at <http://asuseeehacks.blogspot.com/2007/11/asus-eee-pc-user-interface-tour.html>, Nov. 10, 2007, 33 pages.
Advisory Action received for U.S. Appl. No. 14/286,971, dated May 3, 2017, 5 pages.
Agarawala et al., "Database Compendex/EI", Engineering Information, Inc., Apr. 27, 2006, 1 page.
Agarawala et al., "Keepin' It Real: Pushing the Desktop Metaphor with Physics, Piles and the Pen", CHI 2006 Proceedings of the SIGCHI Conference on Human Factors in Computing Systems, Montreal, Québec, Canada, Apr. 22-27, 2006, pp. 1283-1292.
Agarwal, Amit, "iTuneslnlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE-IS&T Electronic Imaging, vol. 5684, 2005, pp. 255-264.
Alam et al., "Web Document Manipulation for Small Screen Devices: A Review", BCL Technologies Inc., Proceedings of the 2nd International Workshop on Web Document Analysis, 2003, pp. 33-36.
Andrew's Widgets, "Developing Dashboard Widgets—A Brief Introduction to Building Widgets for Apple's Dashboard Environment", Available online at <http://andrew.hedges.name/widgets/dev/>, Retrieved on Mar. 13, 2015, 6 pages.
Apparao et al., "Level 1 Document Object Model Specification (Version 1.0)", W3C Working Draft, Available online at <http://www.w3.org/TR/WD-DOM/>, Jul. 20, 1998, 3 pages.
Apple Computer, Inc., "Dashboard Tutorial", Apple Computer, Inc.© 2004, 2006, Jan. 10, 2006, 24 pages.
APPLE.COM, "Tiger Developer Overview Series-Developing Dashboard Widgets", Available online at <http://developer.apple.com/macosx/dashboard.html>, Jun. 26, 2006, 9 pages.
ARS Technica, "CoverFlow: My Visual Album Browser Needs Your Help", ARS Technica OpenForum, Available online at <http://arstechnica.com/civis/viewtopic.php?f=19&t=313706>, Jun. 27, 2005, 37 pp.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.

Buyukkokten et al., "Power Browser: Efficient Web Browsing for PDAs", Proceedings of the SIGCHI conference on Human Factors in Computing Systems, 2000, 8 pages.
Certification of Grant received for Australian Patent Application No. 2011101194, dated Mar. 2, 2012, 2 pages.
Cha, Bonnie, "HTC Touch Diamond (Sprint)", CNET Reviews, available at <http://www.cnet.com/products/htc-touch/>, Sep. 12, 2008, 8 pages.
Chang et al., "Animation: From Cartoons to the User Interface", UIST '93 Proceedings of the 6th Annual ACM Symposium on User Interface Software and Technology, Nov. 1993, pp. 45-55.
Chartier, David, "iPhone 1.1.3 Video Brings the Proof", ars Technica, Available online at <http://arstechnica.com/journals/apple.ars/2007/12/30/iphon e-1-1-3-video-brings-the-proof>, Dec. 30, 2007, 3 pages.
Chen et al., "Dress: A Slicing Tree Based Web Representation for Various Display Sizes", Microsoft Research, Technical Report, Nov. 16, 2002, 9 pages.
CNET, "Video: Create Custom Widgets with Web Clip", CNET News, Available at <http://news.cnet.com/1606-2-6103525.html>, Aug. 8, 2006, 3 pages.
Decision to Grant received for Chinese Patent Application No. 200880110709.X, dated Aug. 6, 2012, 2 pages. (See Communication under 37 CFR § 1.98(a) (3)).
Decision to Grant received for Japanese Patent Application No. 2010-524102, dated May 31, 2013, May 31, 2013, 3 pages. (See Communication under 37 CFR § 1.98(a) (3)).
Del Strother, Jonathan, "Coverflow", Available online at <http://www.steelskies.com/coverflow>, retrieved on Jun. 15, 2006, 14 pages.
Delltech, "Working with Graphics", Windows XP: The Complete Reference, Chapter 18, Apr. 5, 2005, 4 pages.
"Desktop Icon Toy-History", Available online at <http://www.idesksoft.com/history.html>, retrieved on Jan. 2, 2010, 2 pages.
Dodge et al., "Microsoft Office Excel 2003 Office Manual", Microsoft Press, vol. 1, Jul. 12, 2004, 5 pages. (Unable to Locate English Translation).
Enright, Andrew C., "Dissatisfaction Sows Innovation—Visual Browsing in iTunes", Internet Blog, Dec. 29, 2004, 6 pages.
Enright, Andrew C., "Meet Cover Flow", Available online at <http://web.archive.org/web/20060111073239/thetreehouseandthecave.blogspot.com/2005/08/meet-coverflow.html>, retrieved on Feb. 19, 2008, Aug. 13, 2005, 2 pages.
Enright, Andrew C., "Visual Browsing on an iBook OS", Available online at <http://web.archive.org/web/20060111175609/thetreehouseandthecave.blogspot.com/2004/12/visual-browsing-on-ibook-ds.html>, Dec. 29, 2004, 2 page.
Extended European Search Report (includes Partial European Search Report and European Search Opinion) received for European Patent Application No. 12194312.0, dated Jan. 16, 2013, 7 pages.
Extended European Search Report (includes Partial European Search Report and European Search Opinion) received for European Patent Application No. 12194315.3, dated Jan. 16, 2013, 7 pages.
Extended European Search Report (includes Partial European Search Report and European Search Opinion) received for European Patent Application No. 12177813.8, dated Feb. 1, 2013, 6 pages.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Final Office Action received for U.S. Appl. No. 11/850,005, dated Sep. 14, 2012, 9 pages.
Final Office Action received for U.S. Appl. No. 11/850,010, dated Feb. 15, 2013, 12 pages.
Final Office Action received for U.S. Appl. No. 11/850,010, dated Oct. 17, 2011, 11 pages.
Final Office Action received for U.S. Appl. No. 11/850,011, dated Dec. 1, 2010, 15 pages.
Final Office Action received for U.S. Appl. No. 11/961,773, dated Nov. 2, 2011, 12 pages.

(56) References Cited

OTHER PUBLICATIONS

Final Office Action received for U.S. Appl. No. 11/961,773, dated Nov. 29, 2012, 15 pages.
Final Office Action received for U.S. Appl. No. 11/969,800, dated Jun. 15, 2011, 23 pages.
Final Office Action received for U.S. Appl. No. 11/969,800, dated Nov. 5, 2012, 61 pages.
Final Office Action received for U.S. Appl. No. 11/969,809, dated Jul. 14, 2011, 26 pages.
Final Office Action received for U.S. Appl. No. 11/969,912, dated Oct. 31, 2011, 11 pages.
Final Office Action received for U.S. Appl. No. 12/217,029, dated Oct. 5, 2012, 28 pages.
Final Office Action received for U.S. Appl. No. 12/242,851, dated Dec. 12, 2011, 13 pages.
Final Office Action received for U.S. Appl. No. 12/242,851, dated May 10, 2013, 20 pages.
Final Office Action received for U.S. Appl. No. 12/364,470, dated May 5, 2010, 16 pages.
Final Office Action received for U.S. Appl. No. 12/364,470, dated Oct. 19, 2011, 20 pages.
Final Office Action received for U.S. Appl. No. 12/789,427, dated Jul. 2, 2013, 28 pages.
Final Office Action received for U.S. Appl. No. 14/286,971, dated Nov. 25, 2016, 25 pages.
Fondantfancies, "Dash Clipping: Don't Wait for Mac OS X 10.5 Leopard", fondantfancies.com, Available online at <http://www.fondantfancies.com/blog/3001239/>, retrieved on Sep. 3, 2009, 9 pages.
Gade, Lisa, "HTC Touch (Sprint)—MobileTechReview", Smartphone Reviews by Mobile Tech Review, Available online at <http://www.mobiletechreview.com/phones/HTC-Touch.htm>, Nov. 2, 2007, 7 pages.
Goehl et al., "Motion Sensors Gaining Inertia with Popular Consumer Electronics", InvenSense, Inc., 2007, pp. 1-5.
Grant Certificate received for Hong Kong Patent Application No. 12104856.1, dated Jan. 18, 2013, 3 pages.
Grant Certificate received for Hong Kong Patent Application No. 12105182.3, dated Jan. 18, 2013, 3 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Hart, Kim, "Rewriting the Web for Mobile Phones", washingtonpost.com, Available online at <http://www.washingtonpost.com/wp-dyn/content/article/2006/07/25/AR2006072501517_pf.html>, Jul. 26, 2006, 2 pages.
Hesseldahl, Arik, "An App the Mac can Brag About", Forbes.com, Available online at <http://www.forbes.com/2003/12/15/cx_ah_1215tentech_print.html>, Dec. 15, 2003, 4 pages.
Hinckley et al., "Input/Output Devices and Interaction Techniques", CRC Press, Nov. 2004, pp. 1-79.
Hinckley et al., "Sensing Techniques for Mobile Interaction", Symposium on User Interface Software and Technology, CHI Letters, vol. 2, No. 2, Nov. 2000, pp. 91-100.
Hinze, Cody, "Cover Flow—A Beautiful Way to Browse your MP3s", Noise Magazine Blog, Available online at <http://noise.typepad.com/noise_blog/2006/02/cover_flow_the_html>, Feb. 5, 2006, pp. 1-2.
IBM, "Mechanism for Visual Lists and Selections", IBM Technical Disclosure Bulletin, IBM, vol. 40, No. 5, May 1, 1997, 2 pages.
Intention to Grant received for European Patent Application No. 09700333.9, dated Jun. 20, 2013, 7 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/074625, dated Mar. 9, 2010, 6 pages.
International Preliminary Report on Patentability received for PCT Patent Application No. PCT/US2009/030225, dated Jul. 6, 2010, 10 pages.
International Preliminary Report on Patentability received for PCT Patent Application No. PCT/US2010/062307, dated Jul. 19, 2012, 11 pages.
International Search Report and Written Opinion received for PCT Patent Application No. PCT/US2007/077639, dated Jul. 8, 2008, 7 pages.
International Search Report and Written Opinion received for PCT Patent Application No. PCT/US2007/088893, dated Jul. 11, 2008, 10 pages.
International Search Report and Written Opinion received for PCT Patent Application No. PCT/US2008/050428, dated Jun. 5, 2008, 11 pages.
International Search Report and Written Opinion received for PCT Patent Application No. PCT/US2008/05043, dated Jun. 17, 2008, 10 pages.
International Search Report and Written Opinion received for PCT Patent Application No. PCT/US2008/074341, dated Nov. 27, 2009, 12 pages.
International Search Report and Written Opinion received for PCT Patent Application No. PCT/US2009/030225, dated Feb. 25, 2010, 15 pages.
International Search Report and Written Opinion received for PCT Patent Application No. PCT/US2010/062307, dated Apr. 5, 2011, 13 pages.
Invitation to Pay Additional Fees received for PCT Patent Application No. PCT/US2008/050430, dated Jun. 27, 2008, 7 pages.
Invitation to Pay Additional Fees received for PCT Patent Application No. PCT/US2009/030225, dated Nov. 16, 2009, 4 pages.
Jazzmutant, "Jazzmutant Lemur", Available online at <http://64.233.167.104/search?a=cache:3g4wFSaZiXIJ:www.nuloop.c>, Nov. 16, 2005, 3 pages.
Jazzmutant, "The Lemur: Multitouch Control Surface", Available online at <http://64233.167.104/search?q=cache:j0_nFbNVzOcJ:www.cycling7>, retrieved on Nov. 16, 2005, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, 17 pages.
Kinoma, "Kinoma Player 4 EX Documentation", Available online at <http://replay.waybackmachine.org/20061101175306/http://www.kinoma.com/index/pd-player-4>, archived on Nov. 1, 2006, 28 pages.
Laakko et al., "Adapting Web Content to Mobile User Agents", IEEE Internet Computing, vol. 9, No. 2, Mar./Apr. 2005, pp. 46-53.
Macworld, "First Look: Leopard first looks: Dashboard", Available online at <http://www.macworld.com/article/52297/2005/08/leodash.html>, Aug. 9, 2006, 3 pages.
Macworld, "Whip up a widget", Available online at <http://www.macworld.com/article/46622/2005/09/octgeekfactor.html>, Sep. 23, 2005, 6 pages.
Mello, Jr, J., "Tiger's Dashboard Brings Widgets to New Dimension", MacNewsWorld, Available online at <http://www.macnewsworld.com/story/42630.html>, Retrieved on Jun. 23, 2006, 3 pages.
Microwaves RF, "MS Motion Sensors Boost Handset Reliability", Available online at <http://www.mwrf.cp,/Articles/Print.efm?ArticleID=12740>, Copyright 2004, Penton Media Inc., 4 pages.
Non Final Office Action received for U.S. Appl. No. 14/286,971, dated Feb. 26, 2016, 27 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Non-Final Office Action received for U.S. Appl. No. 11/850,005, dated Oct. 24, 2013, 11 pages.

(56) References Cited

OTHER PUBLICATIONS

Non-Final Office Action received for U.S. Appl. No. 11/850,010, dated May 16, 2012, 12 pages.
Non-Final Office Action received for U.S. Appl. No. 11/850,010, dated May 2, 2011, 10 pages.
Non-Final Office Action received for U.S. Appl. No. 11/850,011, dated Aug. 11, 2010, 19 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Non-Final Office Action received for U.S. Appl. No. 11/969,800, dated Feb. 16, 2011, 28 pages.
Non-Final Office Action received for U.S. Appl. No. 11/969,800, dated Jan. 20, 2012, 26 pages.
Non-Final Office Action received for U.S. Appl. No. 11/969,800, dated May 22, 2012, 53 pages.
Non-Final Office Action received for U.S. Appl. No. 11/969,800, dated Sep. 18, 2013, 83 pages.
Non-Final Office Action received for U.S. Appl. No. 11/969,809, dated Mar. 14, 2011, 25 pages.
Non-Final Office Action received for U.S. Appl. No. 11/969,912, dated Apr. 13, 2011, 9 pages.
Non-Final Office Action received for U.S. Appl. No. 11/969,912, dated Sep. 10, 2013, 12 pages.
Non-Final Office Action received for U.S. Appl. No. 12/215,651, dated Aug. 15, 2013, 27 pages.
Non-Final Office Action received for U.S. Appl. No. 12/217,029, dated Apr. 18, 2011, 26 pages.
Non-Final Office Action received for U.S. Appl. No. 12/217,029, dated Aug. 19, 2013, 10 pages.
Non-Final Office Action received for U.S. Appl. No. 12/217,029, dated Jan. 25, 2012, 20 pages.
Non-Final Office Action received for U.S. Appl. No. 12/242,851, dated Apr. 15, 2011, 20 pages.
Non-Final Office Action received for U.S. Appl. No. 12/242,851, dated Sep. 20, 2012, 19 pages.
Non-Final Office Action received for U.S. Appl. No. 12/364,470, dated Mar. 4, 2011, 17 pages.
Non-Final Office Action received for U.S. Appl. No. 12/364,470, dated Nov. 13, 2009, 15 pages.
Non-Final Office Action received for U.S. Appl. No. 12/364,470, dated Sep. 2, 2010, 26 pages.
Non-Final Office Action received for U.S. Appl. No. 12/789,427, dated Dec. 17, 2012, 18 pages.
Non-Final Office Action received for U.S. Appl. No. 13/104,903, dated Nov. 13, 2012, 9 pages.
Non-Final Office Action received for U.S. Appl. No. 13/104,911, dated Feb. 20, 2013, 11 pages.
Non-Final Office Action received for U.S. Appl. No. 13/155,304, dated Sep. 5, 2012, 11 pages.
Non-Final Office Action received for U.S. Appl. No. 13/464,454, dated Jul. 9, 2012, 13 pages.
Notice of Acceptance received for Australian Patent Application No. 2008296445, dated Dec. 14, 2011, 4 pages.
Notice of Acceptance received for Australian Patent Application No. 2011250783, dated May 16, 2013, 2 pages.
Notice of Allowance received for Chinese Patent Application No. 201080063832.8, dated May 24, 2016, 4 pages (2 pages of English Translation).
Notice of Allowance received for Korean Patent Application No. 10-2010-7007258, dated Nov. 20, 2013, 2 pages (See Communication under 37 CFR § 1.98(a) (3)).
Notice of Allowance received for Korean Patent Application No. 1020127019029, dated Jun. 26, 2013, 2 pages (See Communication under 37 CFR § 1.98(a) (3)).
Notice of Allowance received for U.S. Appl. No. 14/011,639, dated Sep. 29, 2015, 11 pages.
Notice of Allowance received for U.S. Appl. No. 12/789,427, dated Apr. 10, 2014, 2 pages.
Notice of Allowance received for U.S. Appl. No. 12/789,427, dated Jan. 13, 2014, 8 pages.
Notice of Allowance received for U.S. Appl. No. 13/464,454, dated May 1, 2013, 6 pages.
Notice of Allowance received for U.S. Appl. No. 11/767,409, dated Jun. 12, 2013, 14 pages.
Notice of Allowance received for U.S. Appl. No. 11/849,938, dated Oct. 10, 2013, 28 pages.
Notice of Allowance received for U.S. Appl. No. 11/850,008, dated Mar. 11, 2011, 7 pages.
Notice of Allowance received for U.S. Appl. No. 11/850,011, dated Feb. 18, 2011, 4 pages.
Notice of Allowance received for U.S. Appl. No. 11/969,809, dated Apr. 26, 2013, 17 pages.
Notice of Allowance received for U.S. Appl. No. 13/104,903, dated Apr. 29, 2013, 6 pages.
Notice of Allowance received for U.S. Appl. No. 13/104,911, dated Jun. 10, 2013, 6 pages.
Notice of Allowance received for U.S. Appl. No. 13/155,304, dated Jul. 25, 2013, 10 pages.
Notice of Allowance received for U.S. Appl. No. 14/011,639, dated Feb. 16, 2016, 5 pages.
Notification of Acceptance received for Australian Patent Application No. 2009204252, dated Oct. 17, 2011, 3 pages.
Office Action received for Australian Patent Application No. 2008296445, dated Oct. 29, 2010, 2 pages.
Office Action received for Australian Patent Application No. 2009204252, dated Nov. 28, 2013, 2 pages.
Office Action received for Australian Patent Application No. 2009204252, dated Apr. 20, 2010, 3 pages.
Office Action received for Australian Patent Application No. 2009204252, dated May 18, 2011, 2 pages.
Office Action received for Australian Patent Application No. 2011101194, dated Oct. 21, 2011, 2 pages.
Office Action Received for Australian Patent Application No. 2011250783, dated Dec. 6, 2012, 3 pages.
Office Action received for Australian Patent Application No. 2012200475, dated Nov. 19, 2013, 4 pages.
Office Action received for Australian Patent Application No. 2012202140, dated Aug. 12, 2013, 2 pages.
Office Action Received for Canadian Patent Application No. 2,661,200, dated Jan. 3, 2013, 5 pages.
Office Action received for Canadian Patent Application No. 2,661,200, dated Nov. 14, 2013, 2 pages.
Office Action received for Chinese Patent Application No. 200780041309.3, dated Jan. 18, 2012, 15 pages (English Translation only).
Office Action received for Chinese Patent Application No. 200780041309.3, dated Nov. 1, 2012, 5 pages (English Translation only).
Office Action received for Chinese Patent Application No. 200780052019.9, dated Jan. 22, 2013, 15 pages (8 pages of English Translation).
Office Action received for Chinese Patent Application No. 200780052019.9, dated Jul. 30, 2013, 8 pages (English Translation Only).
Office Action received for Chinese Patent Application No. 200880112570.2, dated Aug. 24, 2011, dated Aug. 24, 2011, 6 pages.
Office Action received for Chinese Patent Application No. 200980000229.2, dated Nov. 30, 2011, 24 pages (English Translation only).
Office Action received for Chinese Patent Application No. 200980000229.2, dated Oct. 26, 2012, 22 pages (English Translation only).
Office Action received for Chinese Patent Application No. 201080063832.8, dated Apr. 22, 2014, 15 pages (7 pages of English Translation).
Office Action received for Chinese Patent Application No. 201080063832.8, dated Jan. 4, 2015, 6 pages. (See Communication under 37 CFR § 1.98(a) (3)).

(56) References Cited

OTHER PUBLICATIONS

Office Action Received for Chinese Patent Application No. 201080063832.8, dated Sep. 18, 2015, 7 pages. (4 pages of English Translation).
Office Action received for Chinese Patent Application No. 201410305304.9, dated Sep. 28, 2016, 11 pages (4 pages of English translation).
Office Action received for European Patent Application No. 07 869 929.5, dated Dec. 27, 2010, 6 pages.
Office Action received for European Patent Application No. 07814689.1, dated Mar. 4, 2011, 6 pages.
Office Action received for European Patent Application No. 08829660.3, dated Aug. 2, 2013, 7 pages.
Office Action received for European Patent Application No. 08829660.3, dated Oct. 15, 2010, 8 pages.
Office Action received for European Patent Application No. 09700333.9, dated Jun. 10, 2011, 5 pages.
Office Action received for European Patent Application No. 09700333.9, dated Nov. 26, 2010, 5 pages.
Office Action received for European Patent Application No. 10799255.4, dated Apr. 24, 2013, 9 pages.
Office Action received for European Patent Application No. 10799255.4, dated Sep. 23, 2016, 6 pages.
Office Action received for European Patent Application No. 12194312.0, dated Oct. 8, 2013, 5 pages.
Office Action received for European Patent Application No. 12194315.3, dated Oct. 8, 2013, 5 pages.
Office Action received for Japanese Patent Application No. 2009-527624, dated Oct. 1, 2013, Oct. 1, 2013, 9 pages (5 pages of English Translation).
Office Action Received for Japanese Patent Application No. 2009527624, dated Oct. 9, 2012, 3 pages.
Office Action received for Japanese Patent Application No. 2010-524102, dated Feb. 13, 2012, 2 pages (English Translation only).
Office Action received for Japanese Patent Application No. 2010-524102, dated Oct. 26, 2012, 4 pages (English Translation only).
Office Action received for Korean Patent Application No. 10-2010-7007258, dated Aug. 8, 2011, 2 pages (English Translation only).
Office Action received for Korean Patent Application No. 10-2010-7007258, dated Jan. 30, 2013, 8 pages (4 pages of English Translation).
Office Action Received for Korean Patent Application No. 1020127019029, dated Nov. 8, 2012, 2 pages (English Translation only).
Office Action received from Chinese Patent Application No. 200780041309.3, dated Jul. 2, 2013, 12 pages (English Translation only).
Office Action received from Chinese Patent Application No. 200880112570.2, dated Feb. 20, 2013, 7 pages (English Translation only).
Office Action received from Chinese Patent Application No. 200980000229.2, dated Jul. 2, 2013, Jul. 2, 2013, 4 pages (English Translation only).
Oliver, Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.
Opera Software, "Welcome to Widgetize", Copyright© 2006 Opera Software ASA, Available at: <http://widgets.opera.com/widgetize>, 2006, 1 page.
Palme et al., "MIME Encapsulation of Aggregate Documents, such as HTML", Network Working Group, 1999, 24 pages.
Raman et al., "Application-Specific Workload Shaping in Multimedia-Enabled Personal Mobile Devices", CODES+ISSS, Oct. 22-25, 2006, pp. 4-9.
Robie, Jonathan, "What is the Document Object Model?", Texcel Research, available at <http://wvvw.w3.org/TR-DOM/introduction.html>, 2006, 5 pages.
Rose, Michael, "Music in the Home: Interfaces for Music Appliances", Personal Technologies, vol. 4, No. 1, 2000, pp. 45-53.
Salmre, I., "Characteristics of Mobile Applications", Chapter 2, Salmre_02.fm, Dec. 20, 2004, pp. 19-36.
Sawyer, Brian, "Get with the CoverFlow", Available online at <https://briansawyer.net/2005/12/08/get-with-the-coverflow/>, Dec. 9, 2005, 2 pages.
Schreiner, Tony, "High DPI in IE: Tip & Mystery Solved", Tony Schreiner's Blog, available at <http://blogs.msdn.com/tonyschr/archive/2004/05/05/126305.aspx>, May 2004, 2 pages.
SNAPFILES.COM, "Dexpot", Snapfiles, Oct. 10, 2007, 3 pages.
Stampfli, Tracy, "Exploring Full-Screen Mode in Flash Player 9", Available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Summons to Attend Oral Proceedings received for European Patent Application No. 07814689.1, dated Dec. 1, 2011, 11 pages.
Summons to Attend Oral Proceedings received for European Patent Application No. 09700333.9, dated Sep. 21, 2012, 4 pages.
Surfin'Safari, "XUL", Available online at <http://weblogs.mozillazine.org/hyatt.archives/2003_10.html>, Oct. 2003, 7 pages.
Tidwell, Jenifer, "Animated Transition", Designing Interfaces, Patterns for effective Interaction Design, First Edition, Nov. 2005, 4 pages.
W3SCHOOLS,COM, "Playing Videos On The Web", Available online at <http://www.w3schools.com/media/media_browservideos.asp?out=print>, 2006, 3 pages.
W3SCHOOLS.COM, "Multimedia Video Formats", Available online at <http://www.w3sschools.com/media/media_videoformats.asp?output=print>, 2006, 2 pages.
W3SCHOOLS.COM, "Playing QuickTime Movies", Available online at <http://www.3schools.com/media/media_quicktime.asp?output=print>, 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies, International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http:/lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapterl.html>, 2006, 2 pages.
WEBMASTERWORLD.COM, "Page Zooming with IE-Hidden Feature!", Available at <http://www.webmasterworld.com/forum83/4179.htm>, Jul. 2004, 7 pages.
Widgipedia, "I Need a Blog and a Forum Please?", available at: <http://www.widgipedia.com/widgets/details/adni18/hyaloweather_27.html>, retrieved on Oct. 19, 2006, 2 pages.
Wikipedia, "Comparison of Layout Engines", The free encyclopedia, available at <http://en.wikipedia.org/wiki/Comparison_of_layout_engines>, 2006, 3 pages.
Wikipedia, "KDE", The free encyclopedia, available at <http://en.wikipedia.org/wiki/KDE>, 2006, 9 pages.
Wikipedia, "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Wildarya, "iDesksoft Desktop Icon Toy v2.9", Available at: <http://www.dl4all.com/2007/10/16/idesksoft_desktoo_icon_toy_v2.9.html>, Oct. 16, 2007, 4 pages.
Xiao et al., "Slicing*—Tree Based Web Page Transformation for Small Displays", International Conference on Information and Knowledge Management, Oct. 31-Nov. 5, 2005, 2 pages.
Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.

(56) References Cited

OTHER PUBLICATIONS

Zhang et al., "An Ergonomics Study of Menu-Operation on Mobile Phone Interface", In Proceedings of the workshop on Intelligent Information Technology Application, 2007, pp. 247-251.
Intention to Grant received for European Patent Application No. 10799255.4, dated May 31, 2017, 8 pages.
Notice of Allowance received for U.S. Appl. No. 14/286,971, dated Jun. 8, 2017, 14 pages.

* cited by examiner

PORTABLE MULTIFUNCTION DEVICE, METHOD, AND GRAPHICAL USER INTERFACE FOR PLAYING ONLINE VIDEOS

RELATED APPLICATIONS

This application claims priority to U.S. Provisional Patent Application Nos. 60/937,993, "Portable Multifunction Device," filed Jun. 29, 2007; and 60/936,562, "Portable Multifunction Device, Method, and Graphical User Interface for Playing Online Videos," filed Jun. 20, 2007. Both of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, "Portable Multifunction Device," filed Sep. 6, 2006; (12) U.S. Provisional Patent Application No. 60/879,253, "Portable Multifunction Device," filed Jan. 7, 2007; and (13) U.S. Provisional Patent Application No. 60/879,469, "Portable Multifunction Device," filed Jan. 8, 2007. All of these applications are incorporated by reference herein in their entirety.

TECHNICAL FIELD

The disclosed embodiments relate generally to portable electronic devices, and more particularly, to portable devices that access and display online videos.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

At present, online videos (e.g., videos available at a website such as www.youtube.com) are widely viewed using web browser applications on desktop computers and other computers with relatively large screens. However, it is significantly more difficult to browse, receive, view, and manage online videos on computers with smaller screens, such as handheld devices. This difficulty arises in part because of the small screen size and in part because of the need to navigate through a browser application to a website that includes online videos. Thus, at present, relatively few people browse, receive and view online videos on portable devices with small screens.

Accordingly, there is a need for portable multifunction devices with more transparent and intuitive user interfaces for browsing, receiving and playing online videos. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method is performed at a portable electronic device with a touch screen display. The computer-implemented method includes: displaying a first list of information about online video items in a plurality of lists of information about online video items; displaying a plurality of icons corresponding to at least some of the plurality of lists of information about online video items; in response to detecting a moving finger gesture on the first list of information about content items, scrolling the first list of information about content items; in response to detecting a stationary finger contact on a first portion of a row in the first list of information about online video items, wherein the row contains information about a particular online video item: initiating a request for the particular online video item from a remote computer, receiving the particular online video item, and playing the particular online video item; and, in response to detecting a finger contact on a respective icon in the plurality of icons, displaying a corresponding list of information about online video items.

In accordance with some embodiments, a graphical user interface on a portable electronic device with a touch screen display includes: a first list of information about online video items in a plurality of lists of information about online video items; and a plurality of icons corresponding to at least some of the plurality of lists of information about online video items. In response to detecting a finger contact on a first portion of a row in the first list of information about online video items, wherein the row contains information about a particular online video item: a request is initiated for the particular online video item from a remote computer, the particular online video item is received, and the particular online video item is played. In response to detecting a finger contact on a second portion of the row in the first list of information about online video items, wherein the second portion of the row is different from the first portion of the row, additional information is displayed about the particular online video item. In response to detecting a finger contact on a respective icon in the plurality of icons, a corresponding list of information about online video items is displayed.

In accordance with some embodiments, a portable computing device includes: a touch screen display; one or more processors; memory; and one or more programs. The one or more programs are stored in the memory and configured to be executed by the one or more processors. The one or more programs include: instructions for displaying a first list of information about online video items in a plurality of lists of information about online video items; instructions for displaying a plurality of icons corresponding to at least some of the plurality of lists of information about online video items; instructions for, in response to detecting a moving finger gesture on the first list of information about content items, scrolling the first list of information about content items; instructions for, in response to detecting a stationary finger contact on a first portion of a row in the first list of information about online video items, wherein the row contains information about a particular online video item: initiating a request for the particular online video item from a remote computer, receiving the particular online video item, and playing the particular online video item; and instructions for, in response to detecting a finger contact on a respective icon in the plurality of icons, displaying a corresponding list of information about online video items.

In accordance with some embodiments, a computer-program product, includes: a computer readable storage medium and a computer program mechanism embedded therein. The computer program mechanism includes instructions, which when executed by a portable computing device with a touch screen display, cause the device to: display a first list of information about online video items in a plurality of lists of information about online video items; display a plurality of icons corresponding to at least some of the plurality of lists of information about online video items; in response to detecting a moving finger gesture on the first list of information about content items, scroll the first list of information about content items; in response to detecting a stationary finger contact on a first portion of a row in the first list of information about online video items, wherein the row contains information about a particular online video item: initiate a request for the particular online video item from a remote computer, receive the particular online video item, and play the particular online video item; and in response to detecting a finger contact on a respective icon in the plurality of icons, display a corresponding list of information about online video items.

In accordance with some embodiments, a portable computing device with a touch screen display includes: means for displaying a first list of information about online video items in a plurality of lists of information about online video items; means for displaying a plurality of icons corresponding to at least some of the plurality of lists of information about online video items; means for, in response to detecting a moving finger gesture on the first list of information about content items, scrolling the first list of information about content items; means for, in response to detecting a stationary finger contact on a first portion of a row in the first list of information about online video items, wherein the row contains information about a particular online video item: initiating a request for the particular online video item from a remote computer, receiving the particular online video item, and playing the particular online video item; and means for, in response to detecting a finger contact on a respective icon in the plurality of icons, displaying a corresponding list of information about online video items.

Thus, a portable electronic device is provided with a more efficient and intuitive user interface for browsing, receiving and playing online videos.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
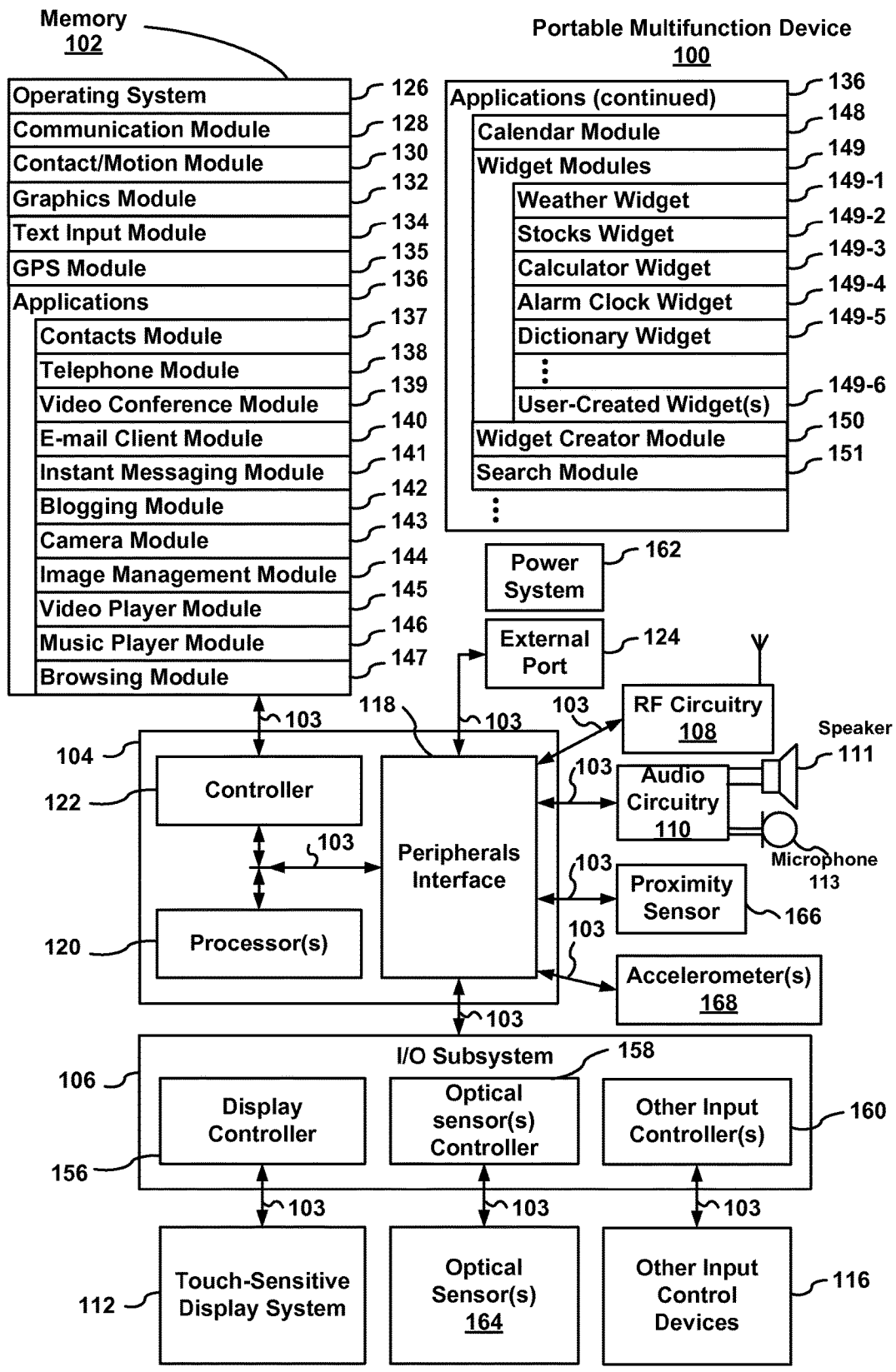
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
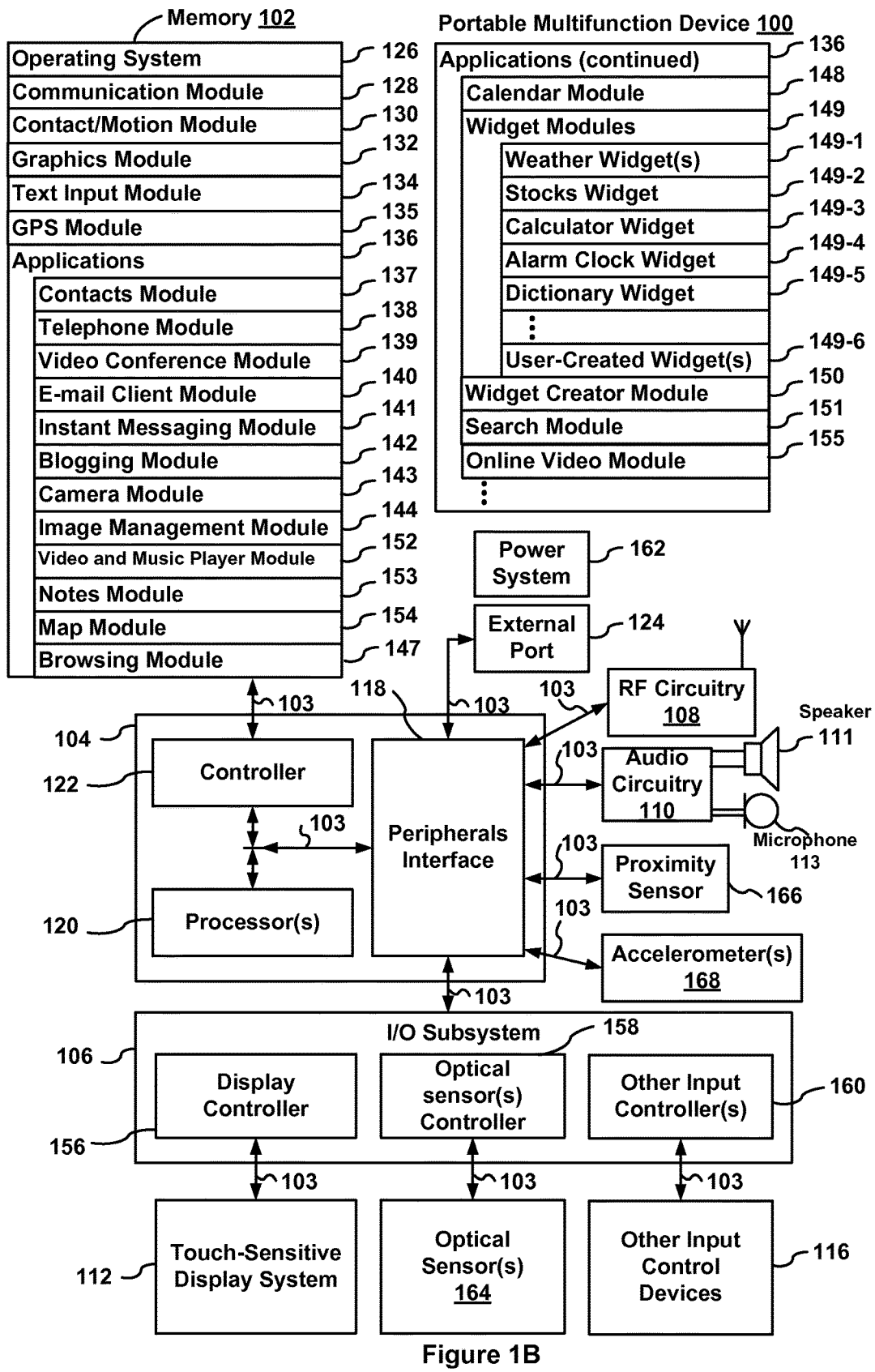

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2007; 11/240,788, "Proximity Detector In Handheld Device," filed Sep. 30, 2007; 11/620,702, "Using Ambient Light Sensor To Augment Proximity Sensor Output"; 11/586,862, "Automated Response To And Sensing Of User Activity In Portable Devices," filed Oct. 24, 2006; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);

a telephone module 138;

a video conferencing module 139;

an e-mail client module 140;

an instant messaging (IM) module 141;

a blogging module 142;

a camera module 143 for still and/or video images;

an image management module 144;

a video player module 145;

a music player module 146;

a browser module 147;

a calendar module 148;

widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
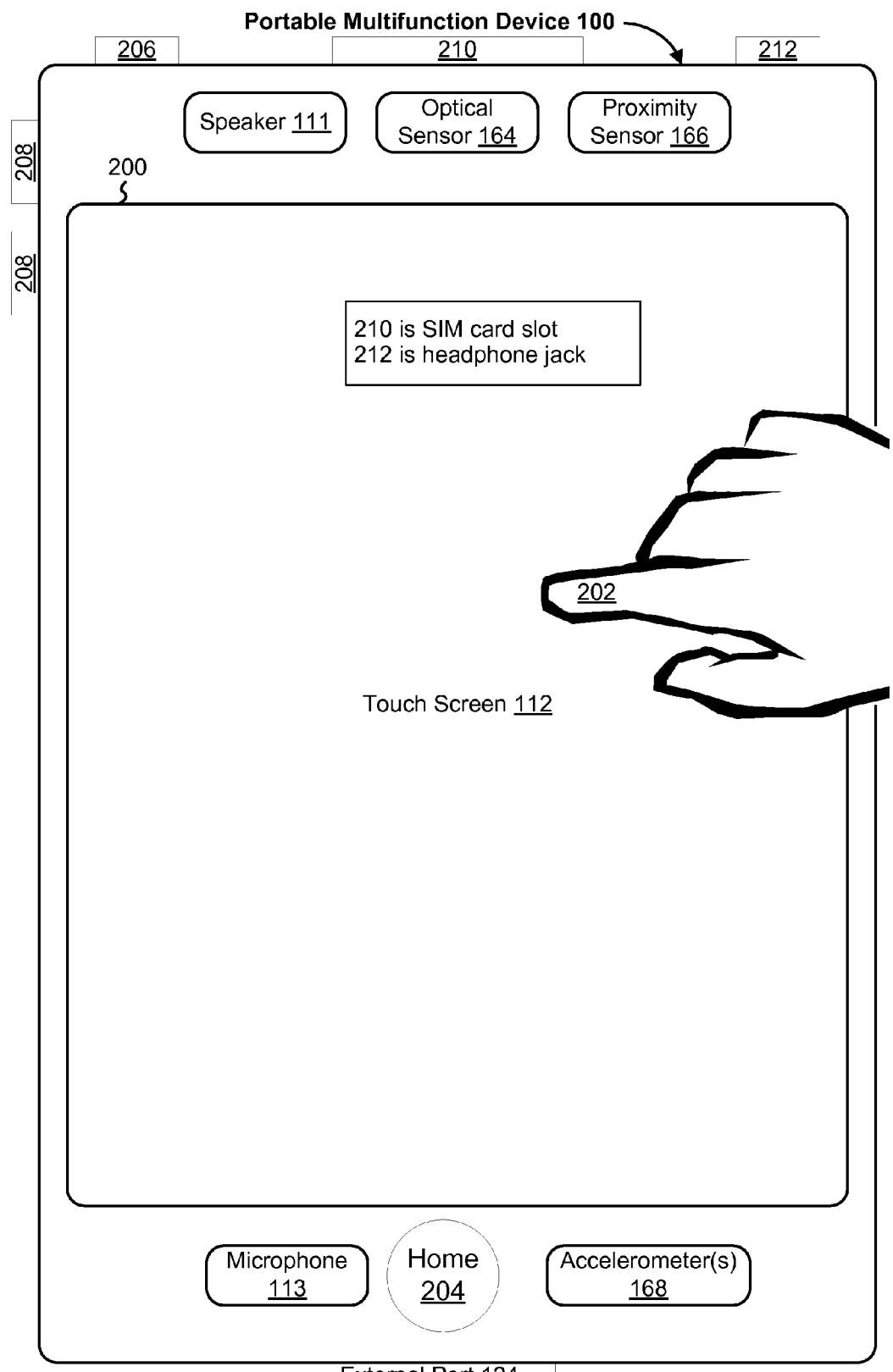
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
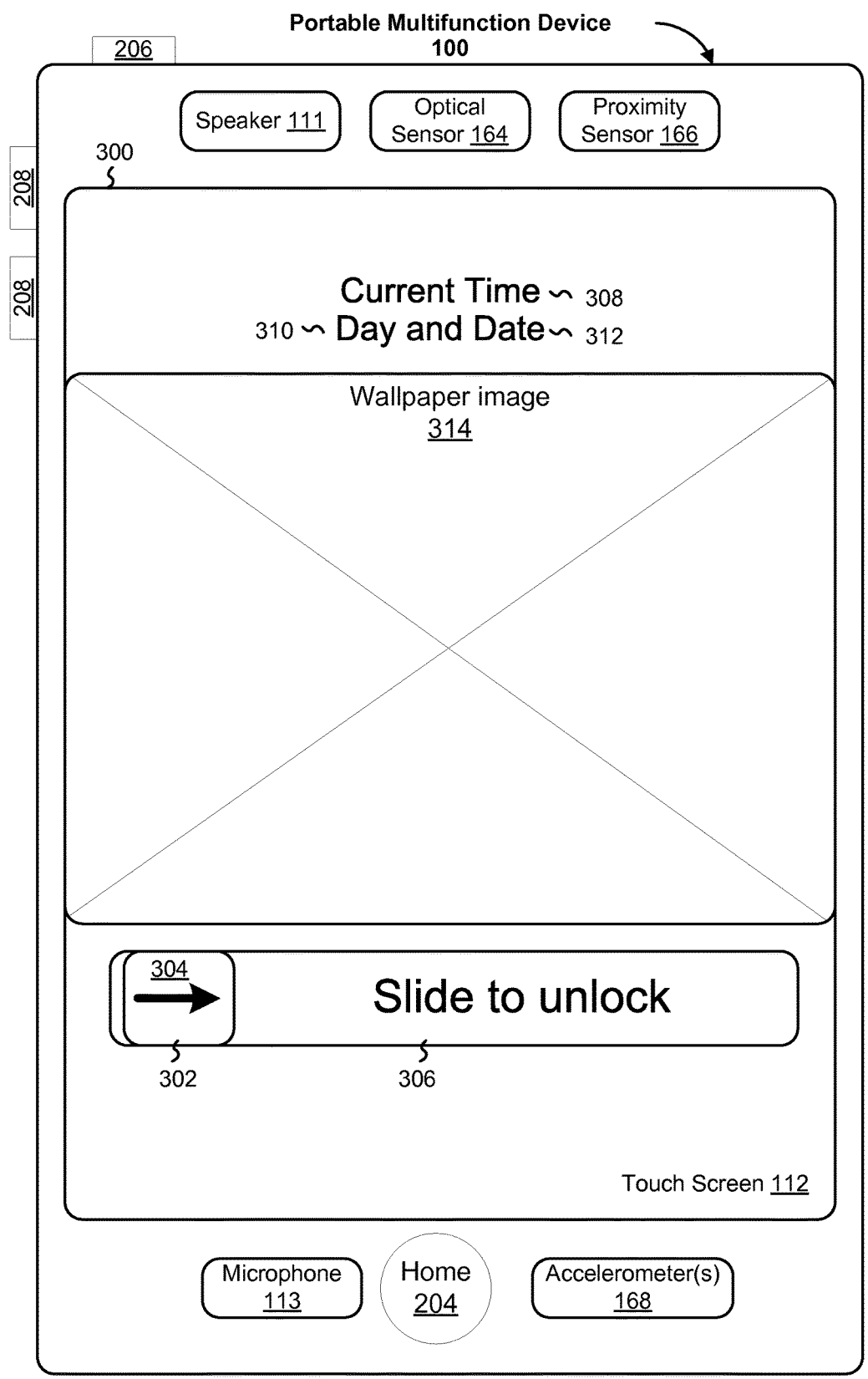
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;

Arrow 304 that provides a visual cue to the unlock gesture;

Channel 306 that provides additional cues to the unlock gesture;

Time 308;

Day 310;

Date 312; and

Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference in their entirety.

Figure 4A:
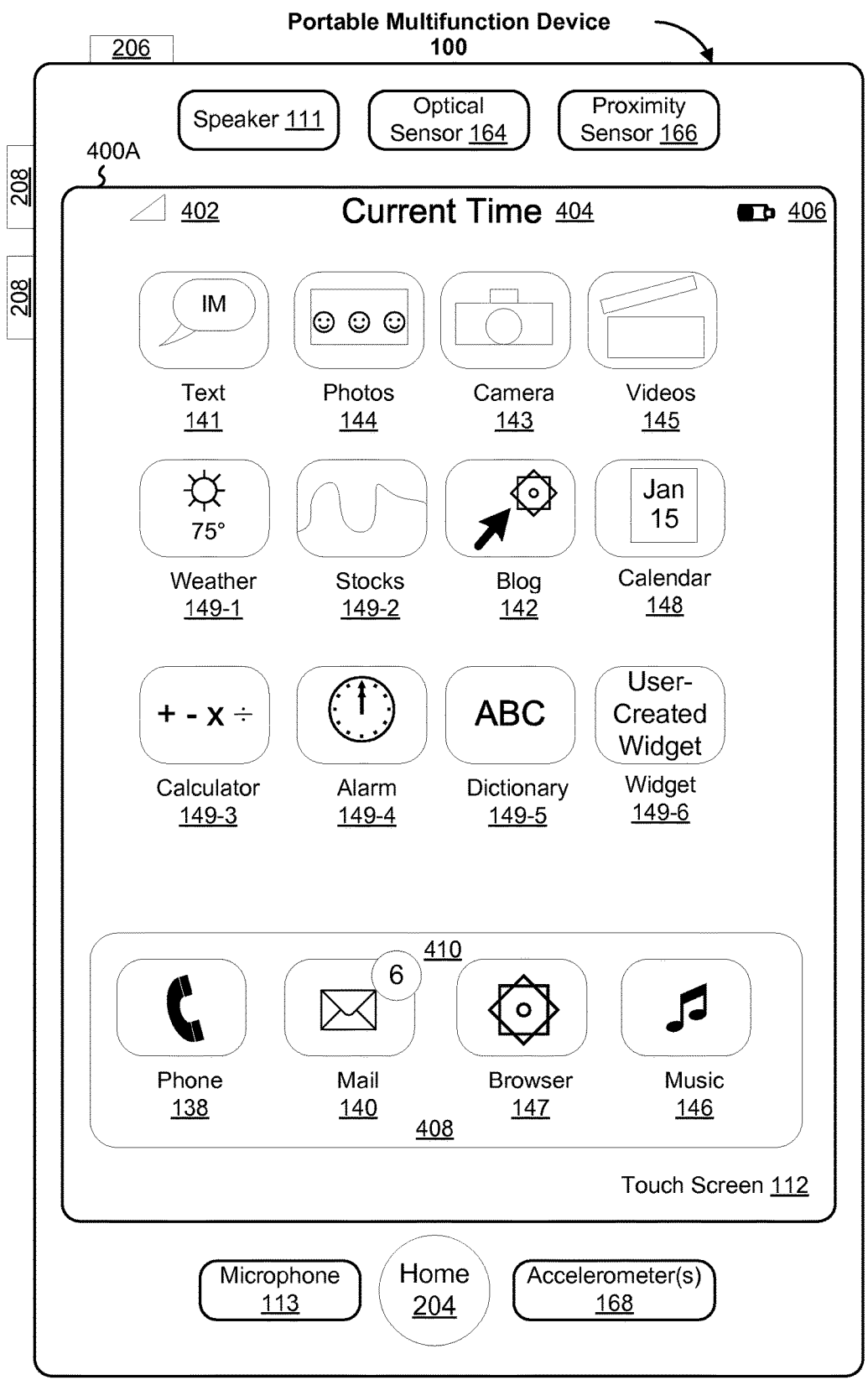
FIGS. 4A and 4B illustrate exemplary user interfaces for a menu of applications on a portable multifunction device in accordance with some embodiments.
Figure 4B:
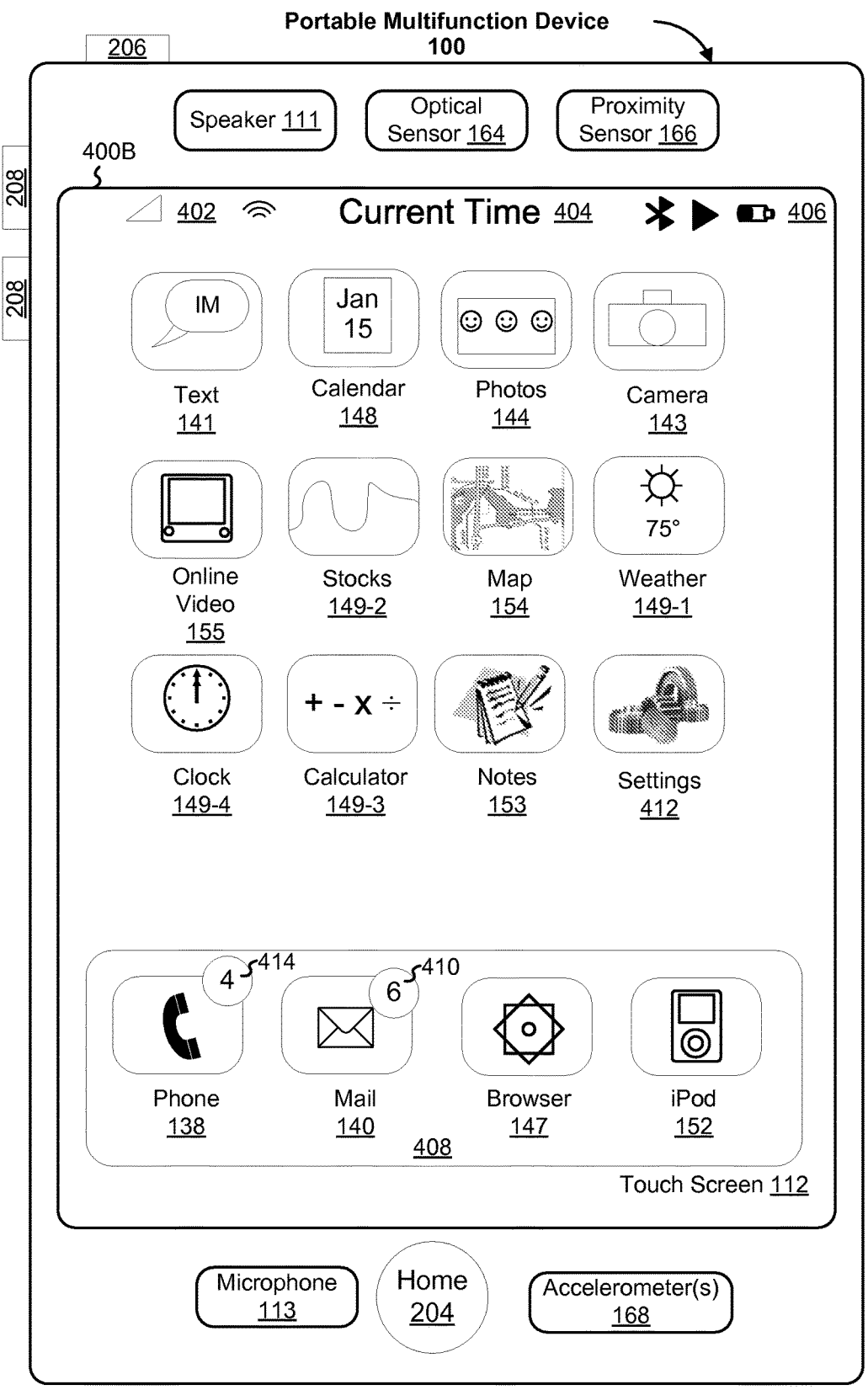

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;

Time 404;

Battery status indicator 406;

Tray 408 with icons for frequently used applications, such as:

Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:

IM 141;

Image management 144;

Camera 143;

Video player 145;

Weather 149-1;

Stocks 149-2;

Blog 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below;

Video and music player module 152, also referred to as iPod (trademark of Apple Computer, Inc.) module 152; and Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5A:
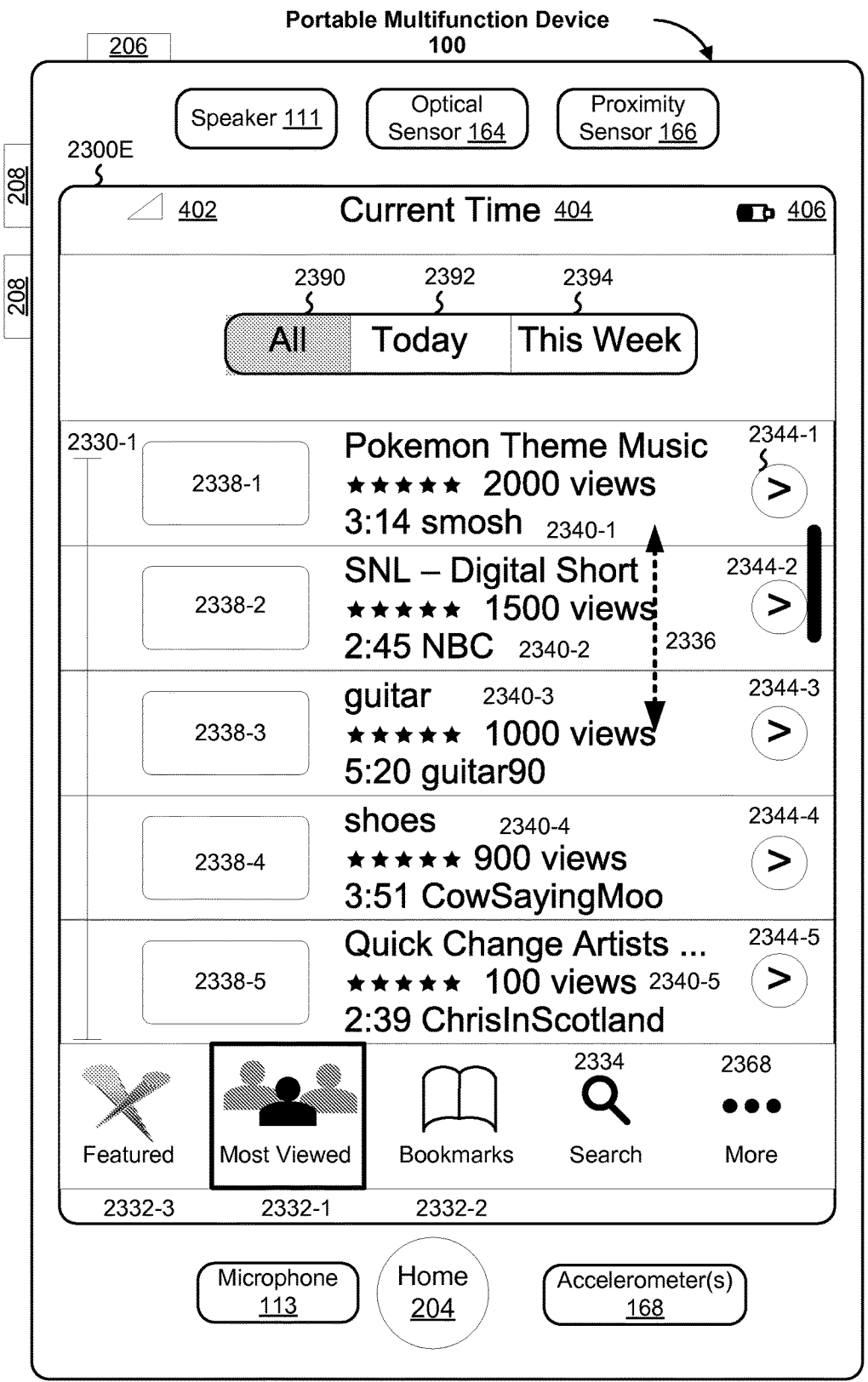
FIGS. 5A-5P illustrate exemplary user interfaces for an online video application for a portable multifunction device in accordance with some embodiments.
Figure 5B:
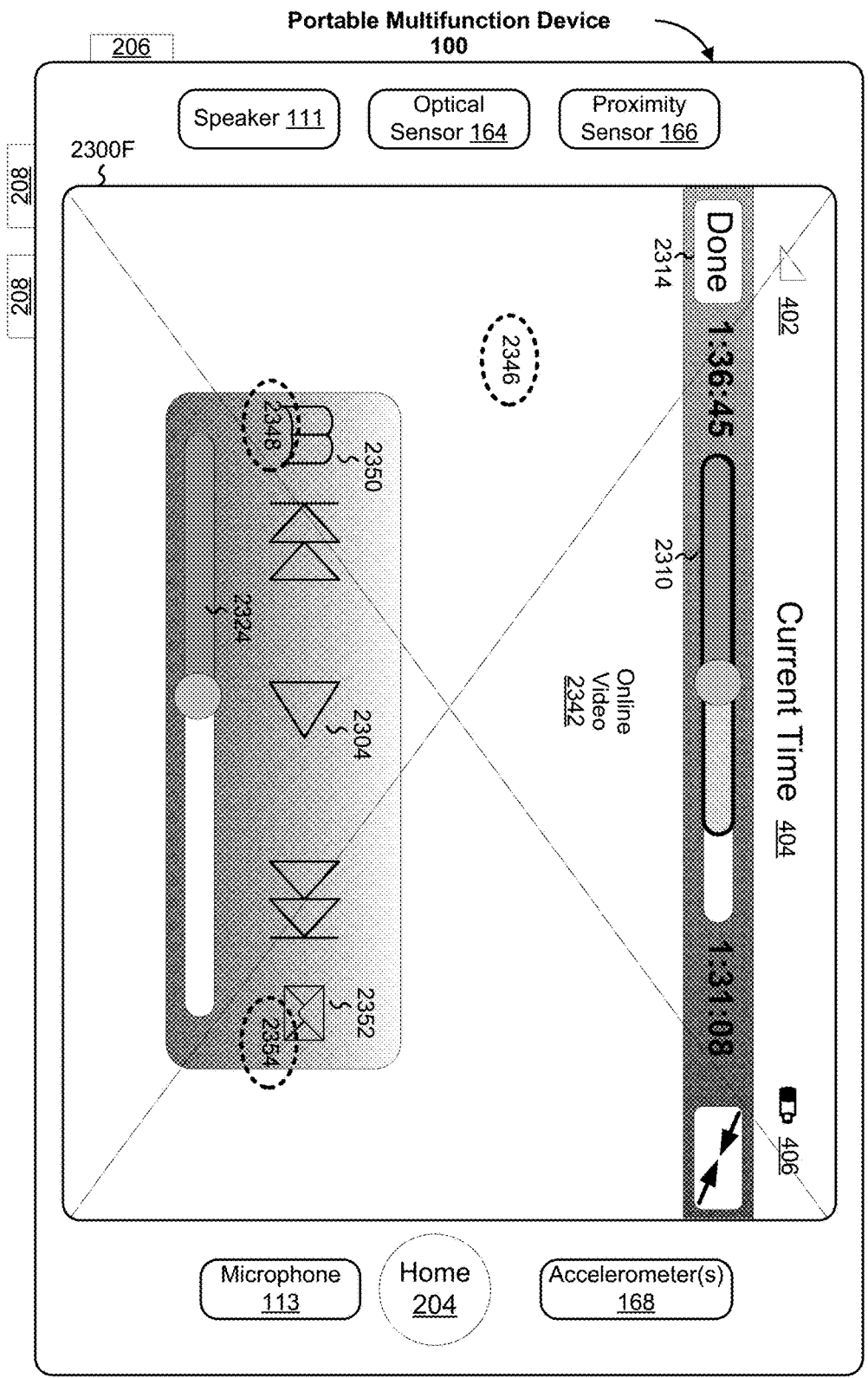
Figure 5C:
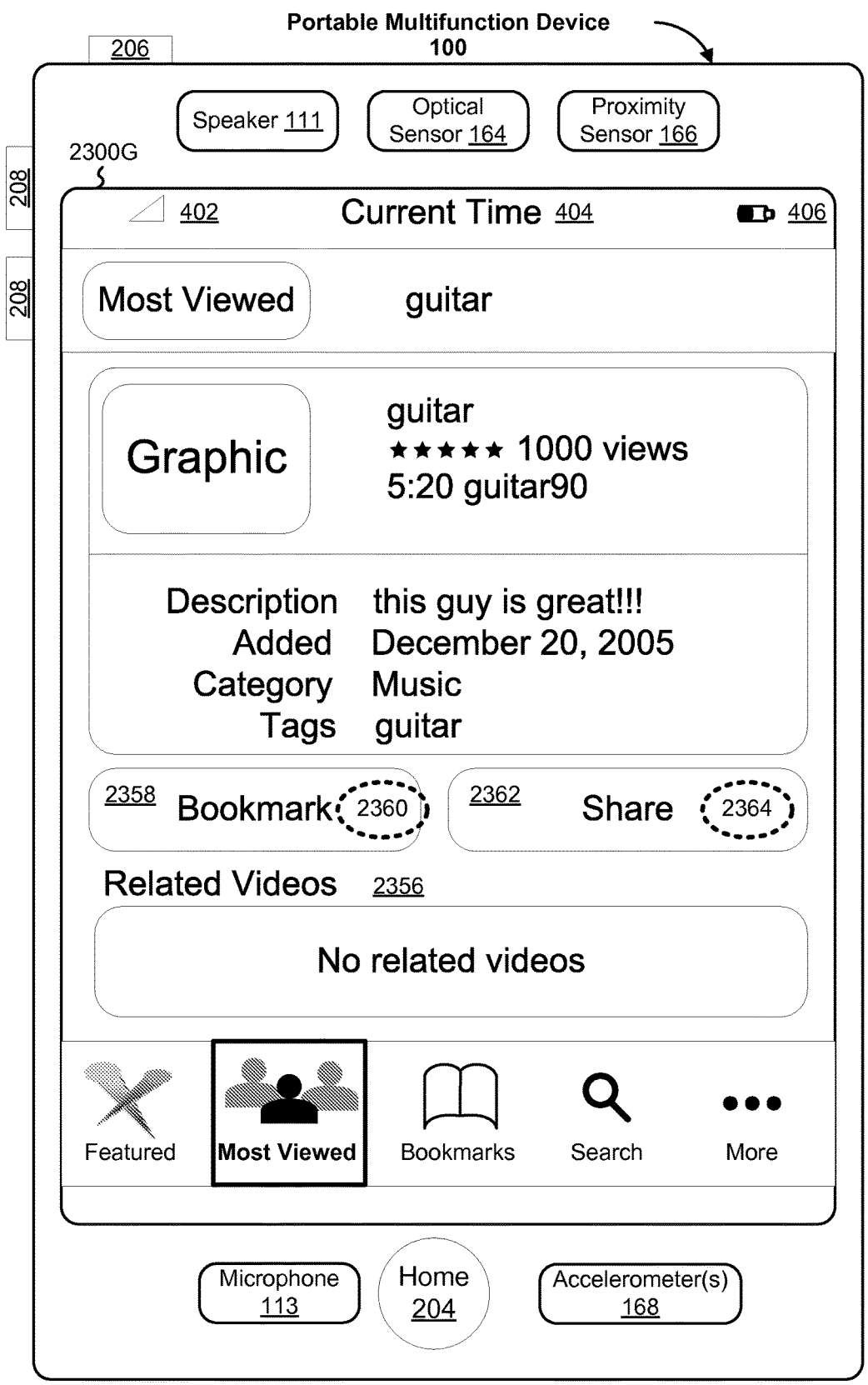
Figure 5D:
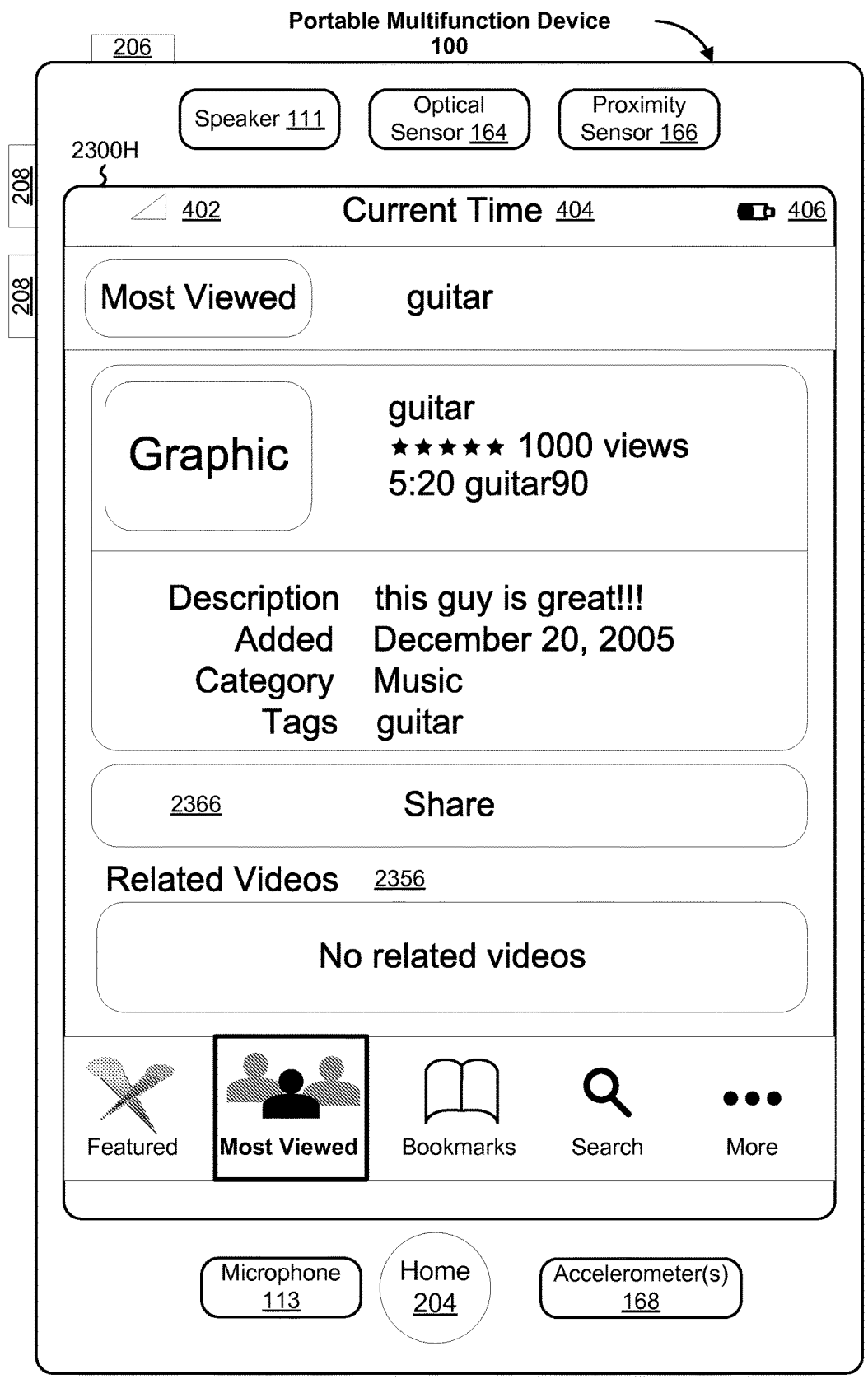
Figure 5E:
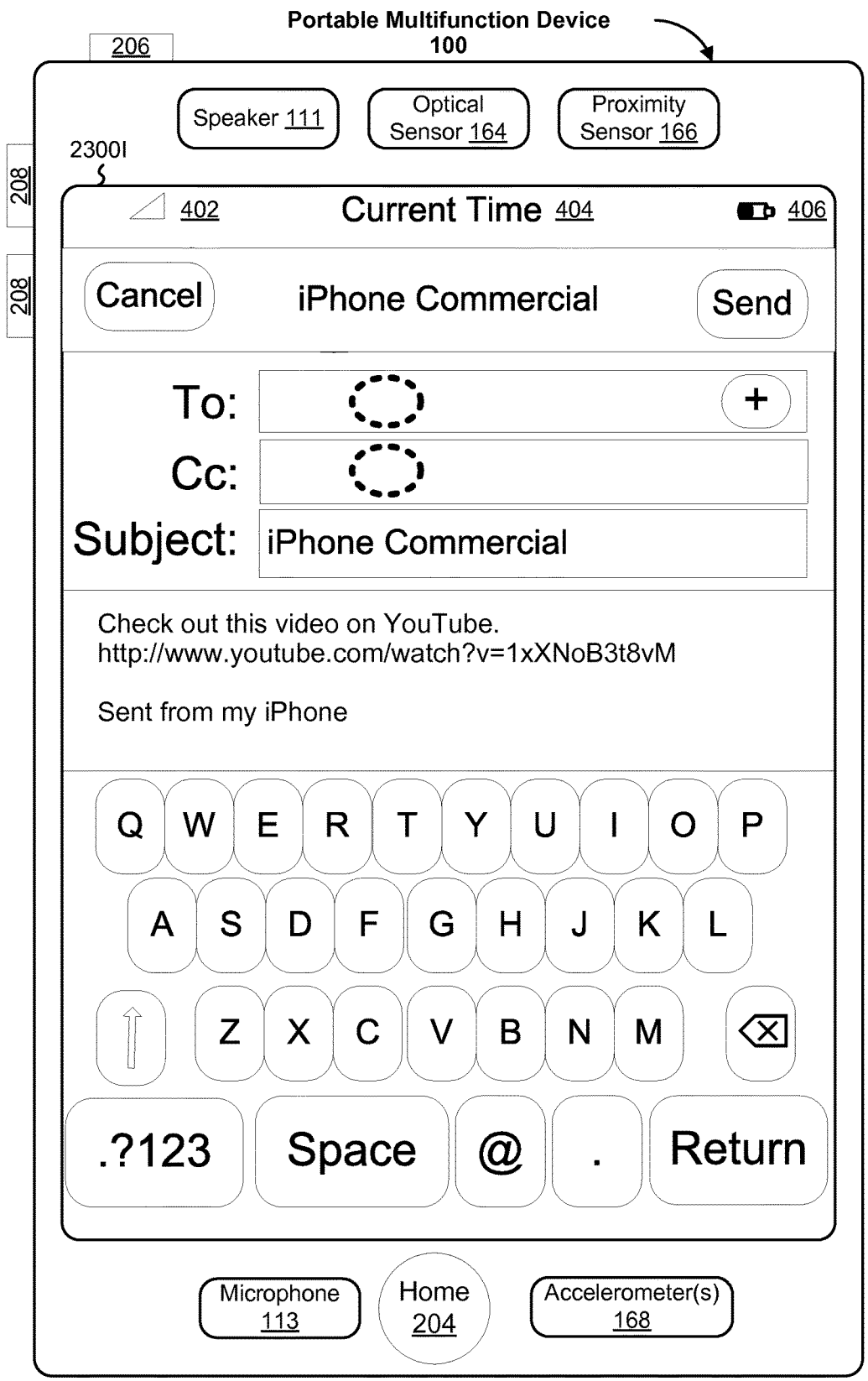
Figure 5F:
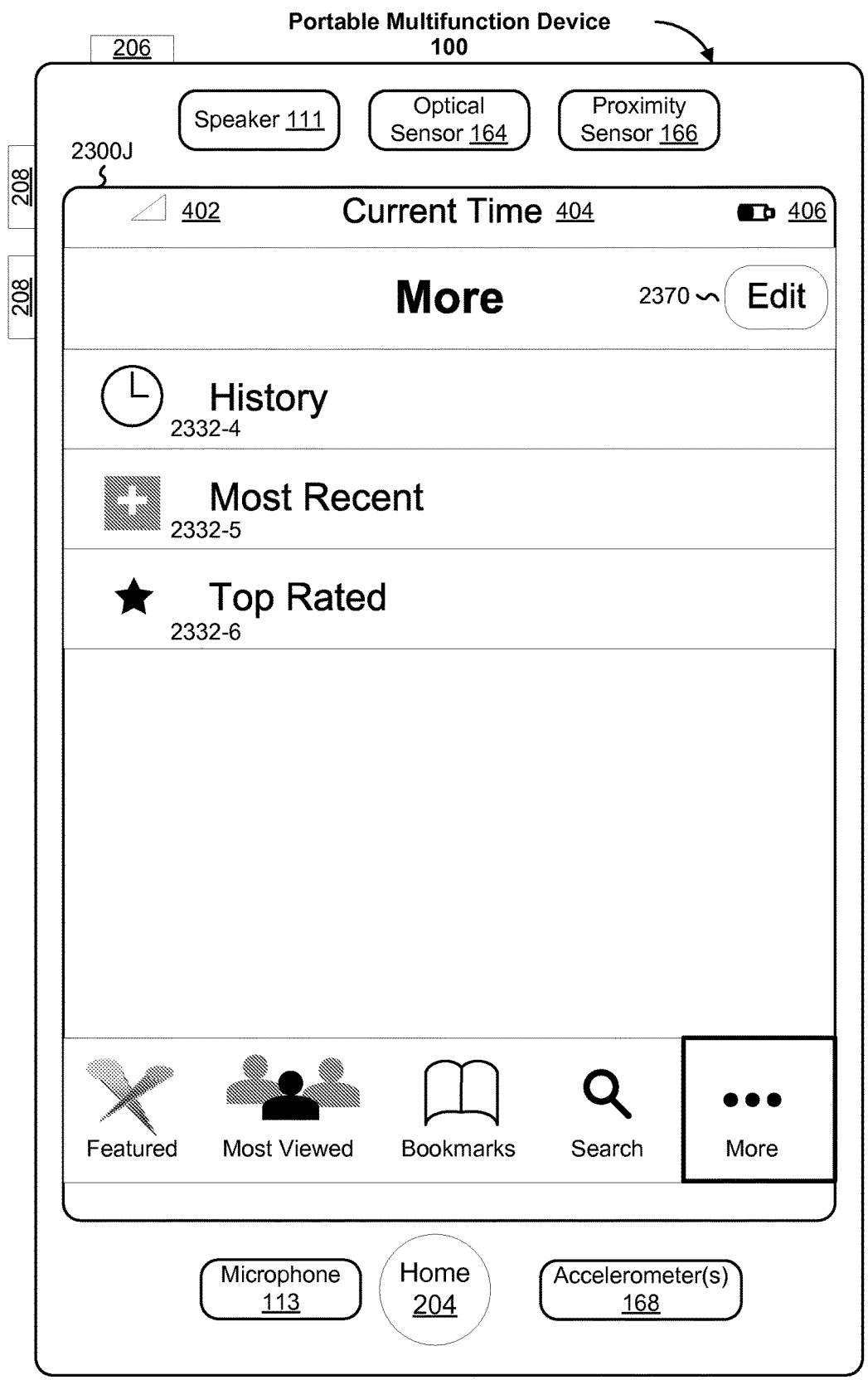
Figure 5G:
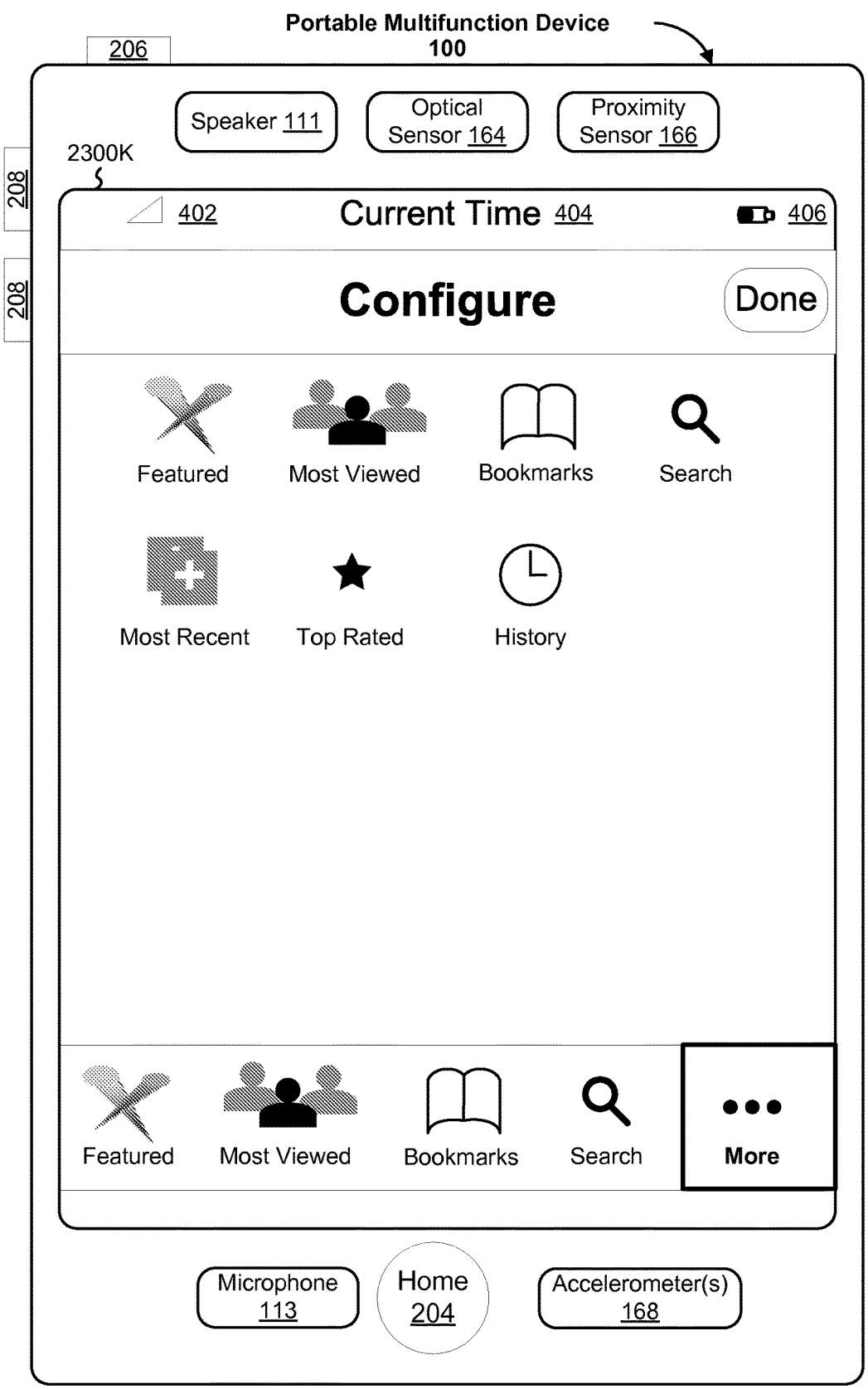
Figure 5H:
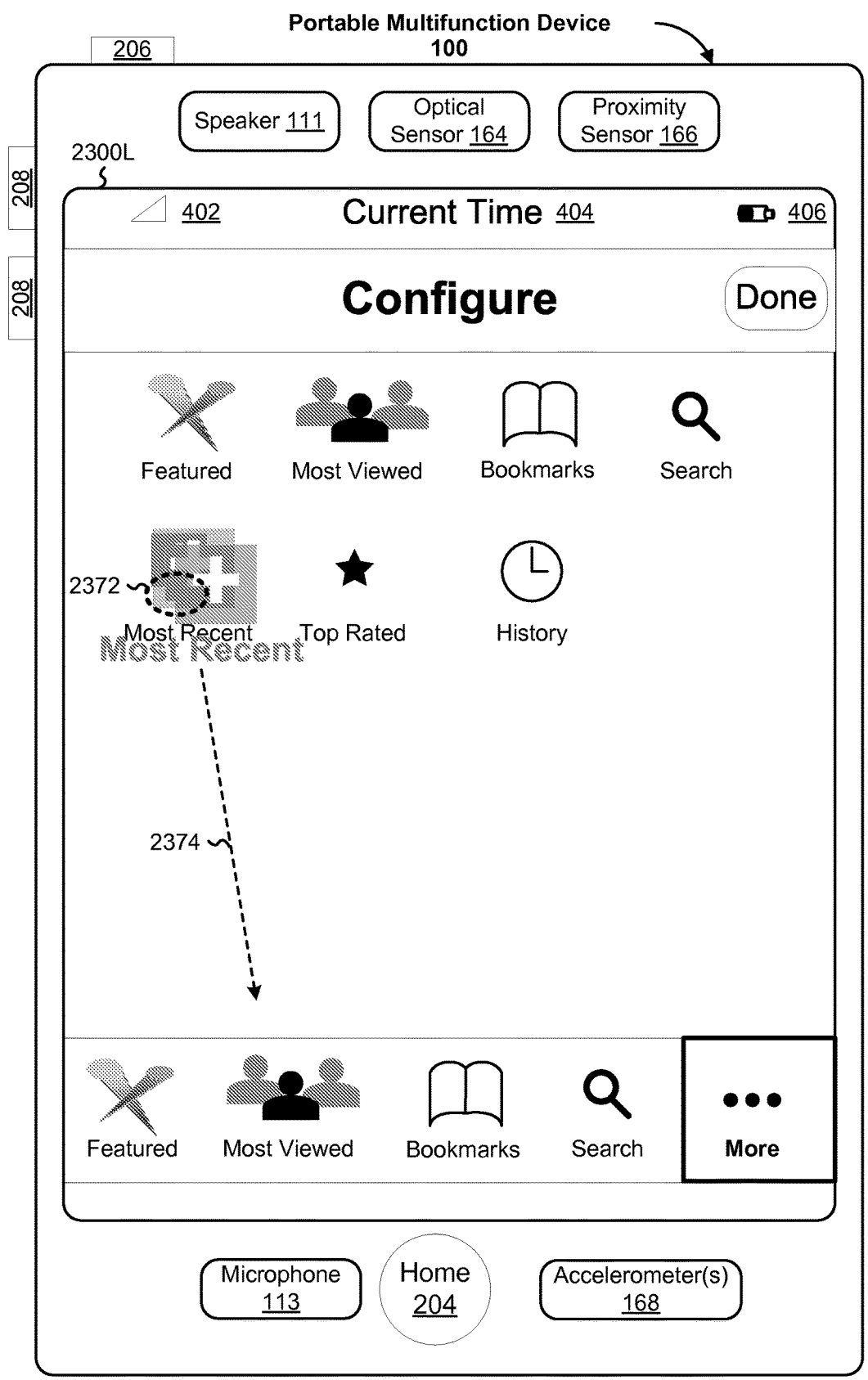
Figure 5I:
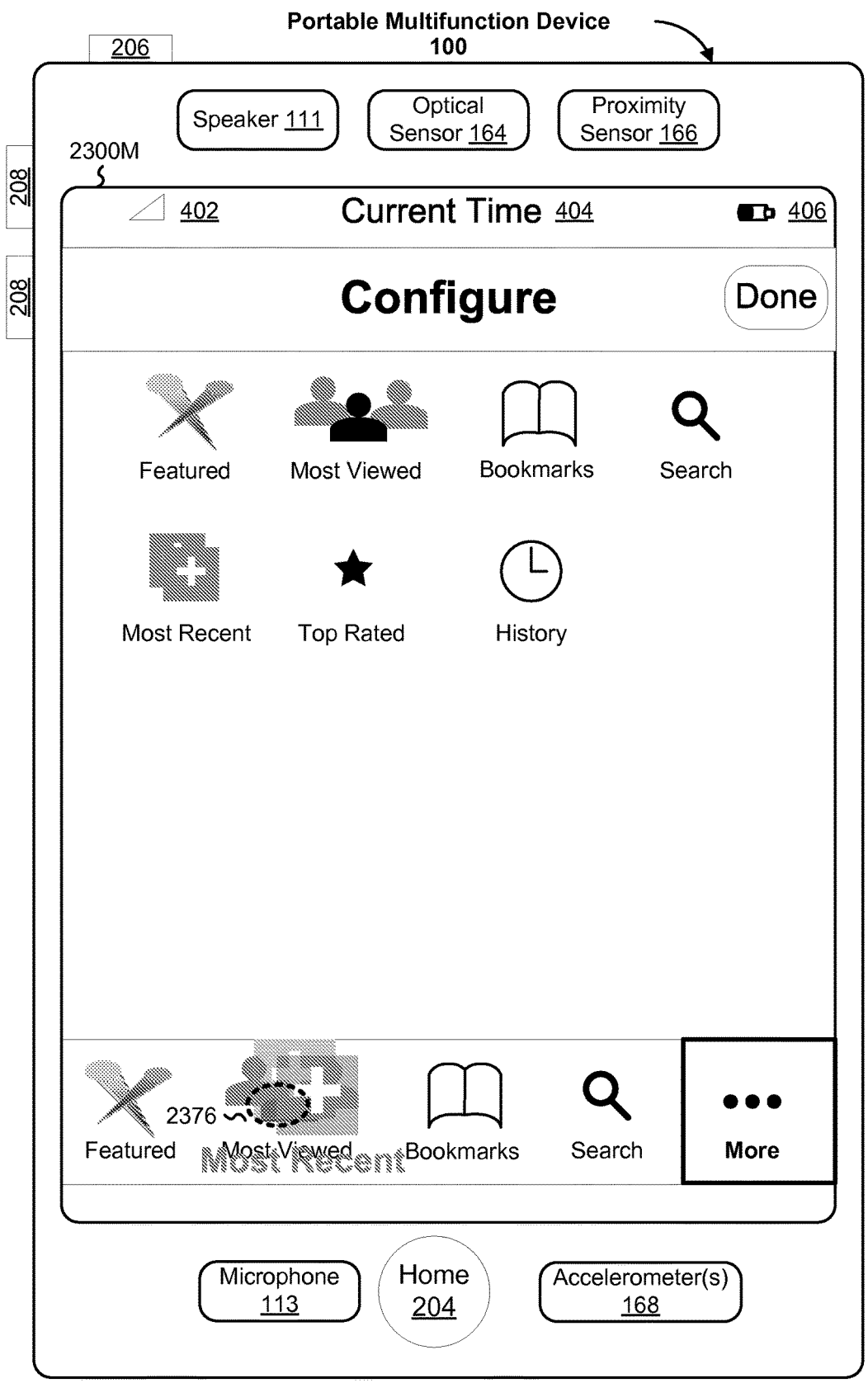
Figure 5J:
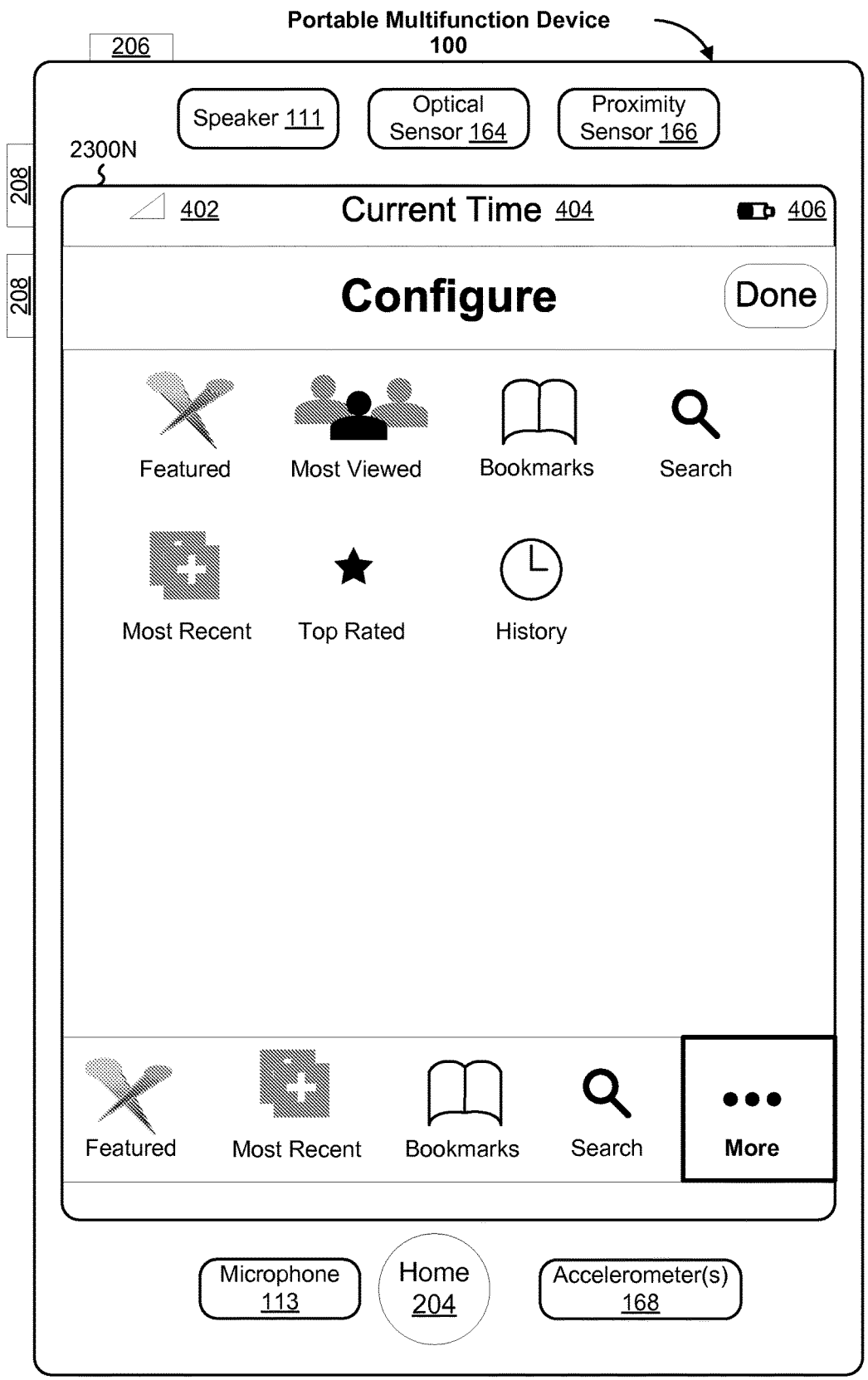
Figure 5K:
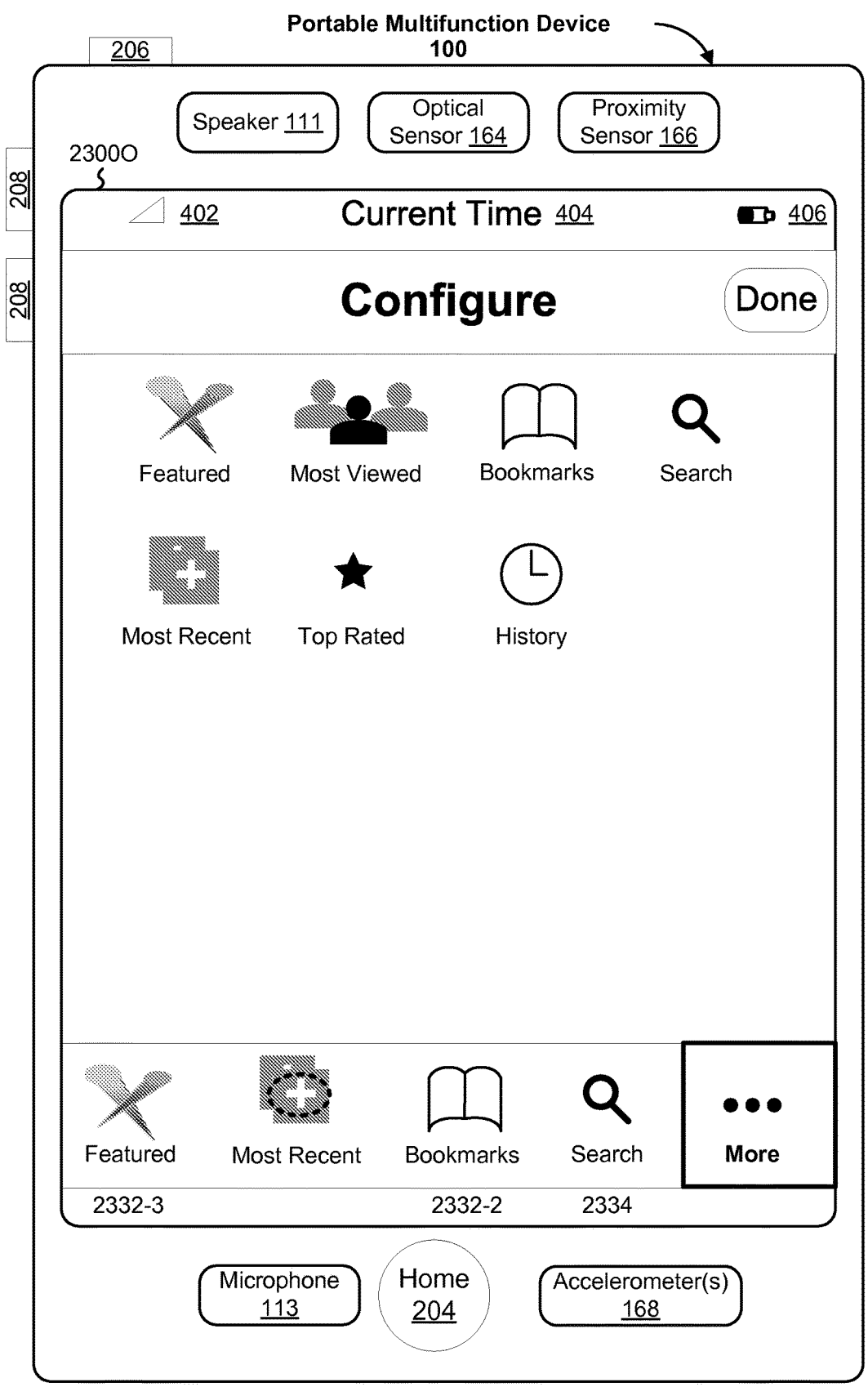
Figure 5L:
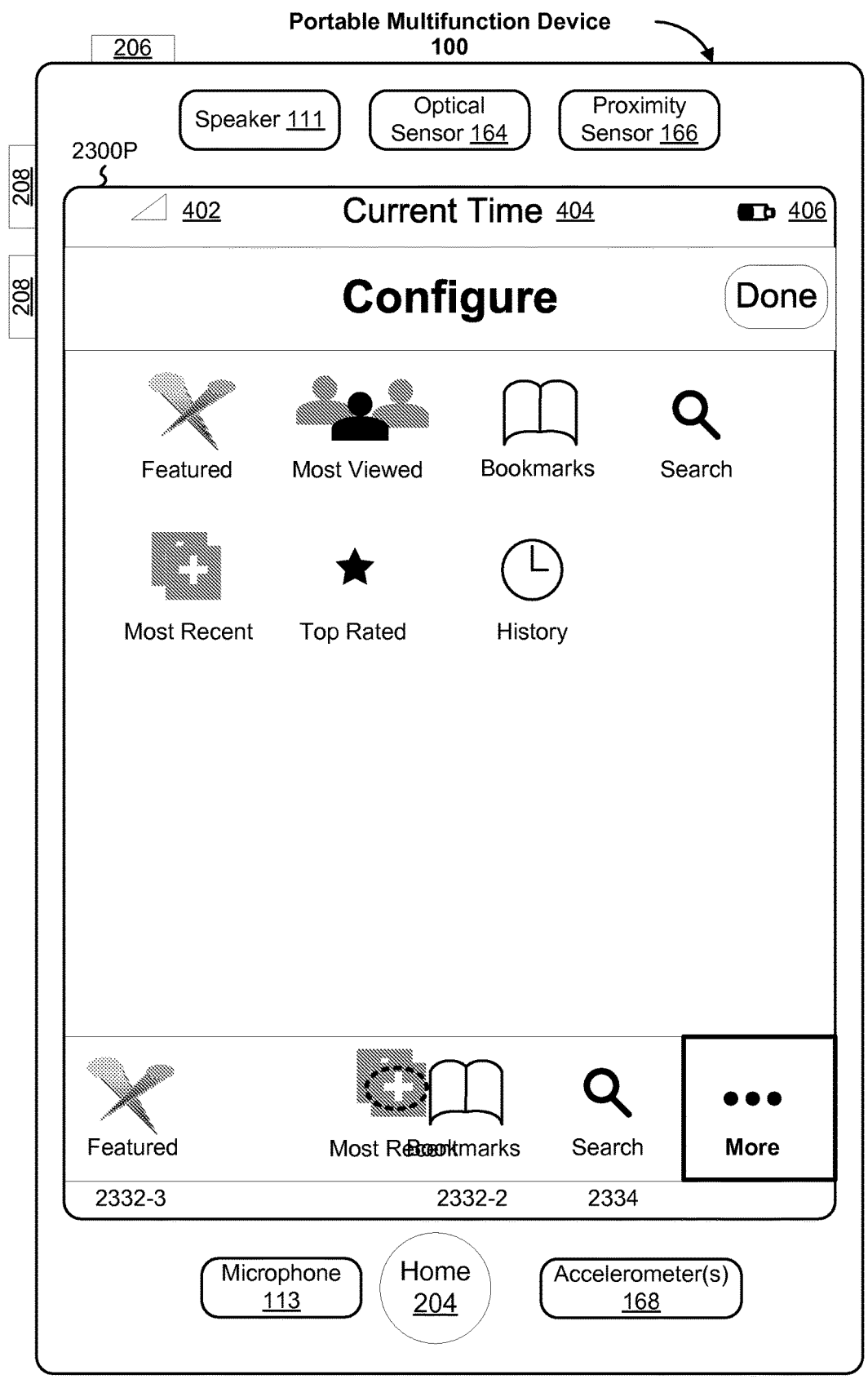
Figure 5M:
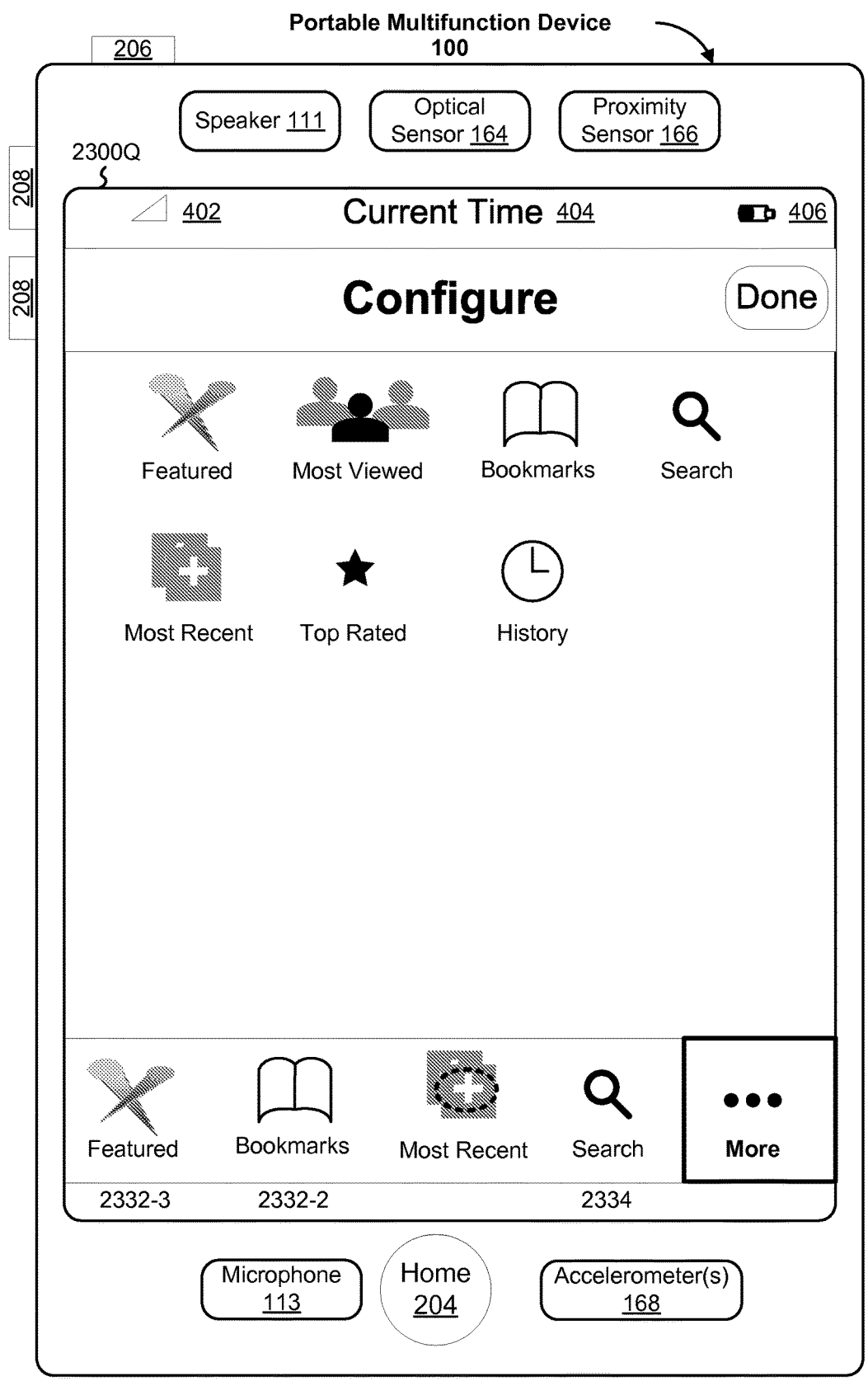
Figure 5N:
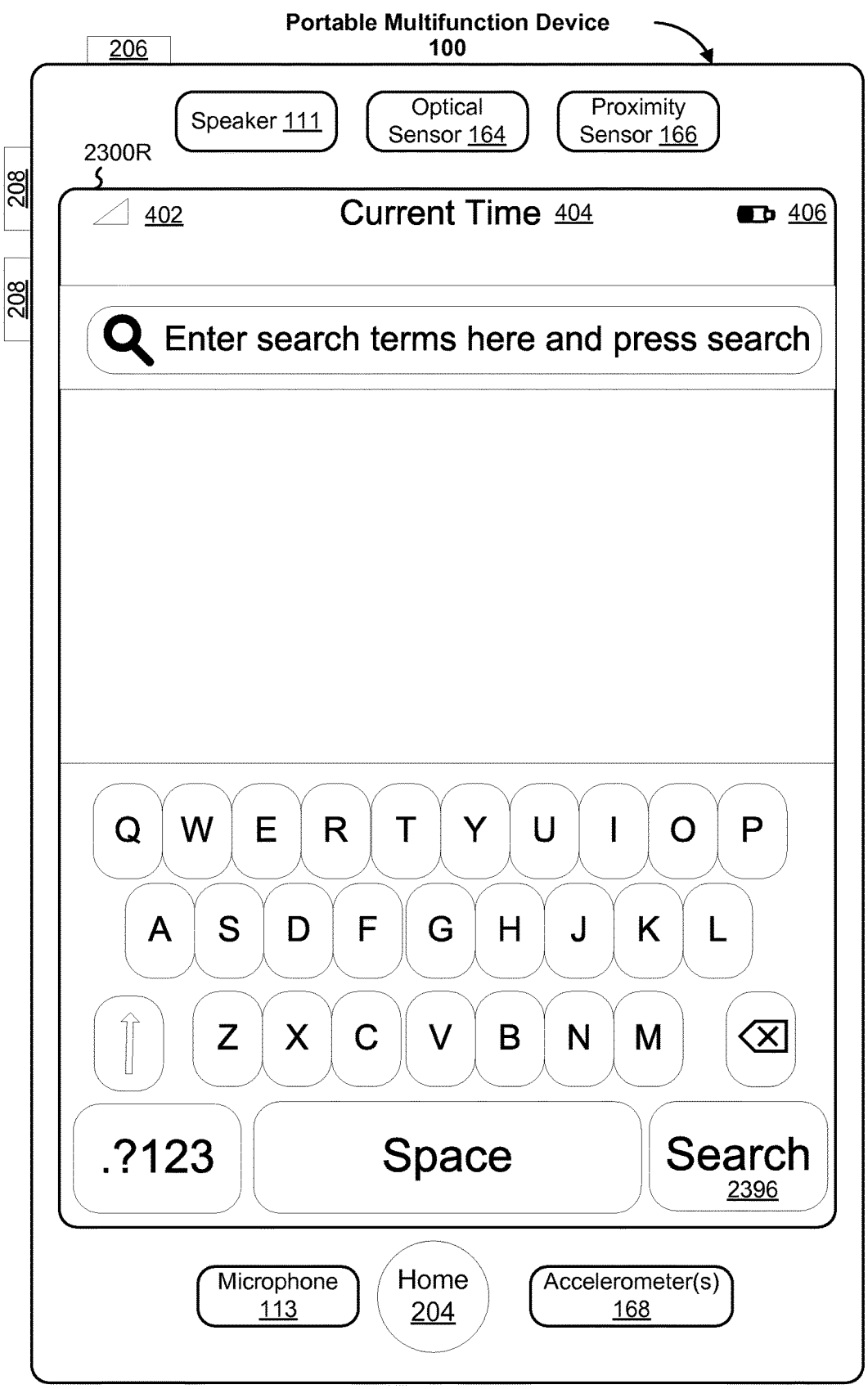
Figure 5O:
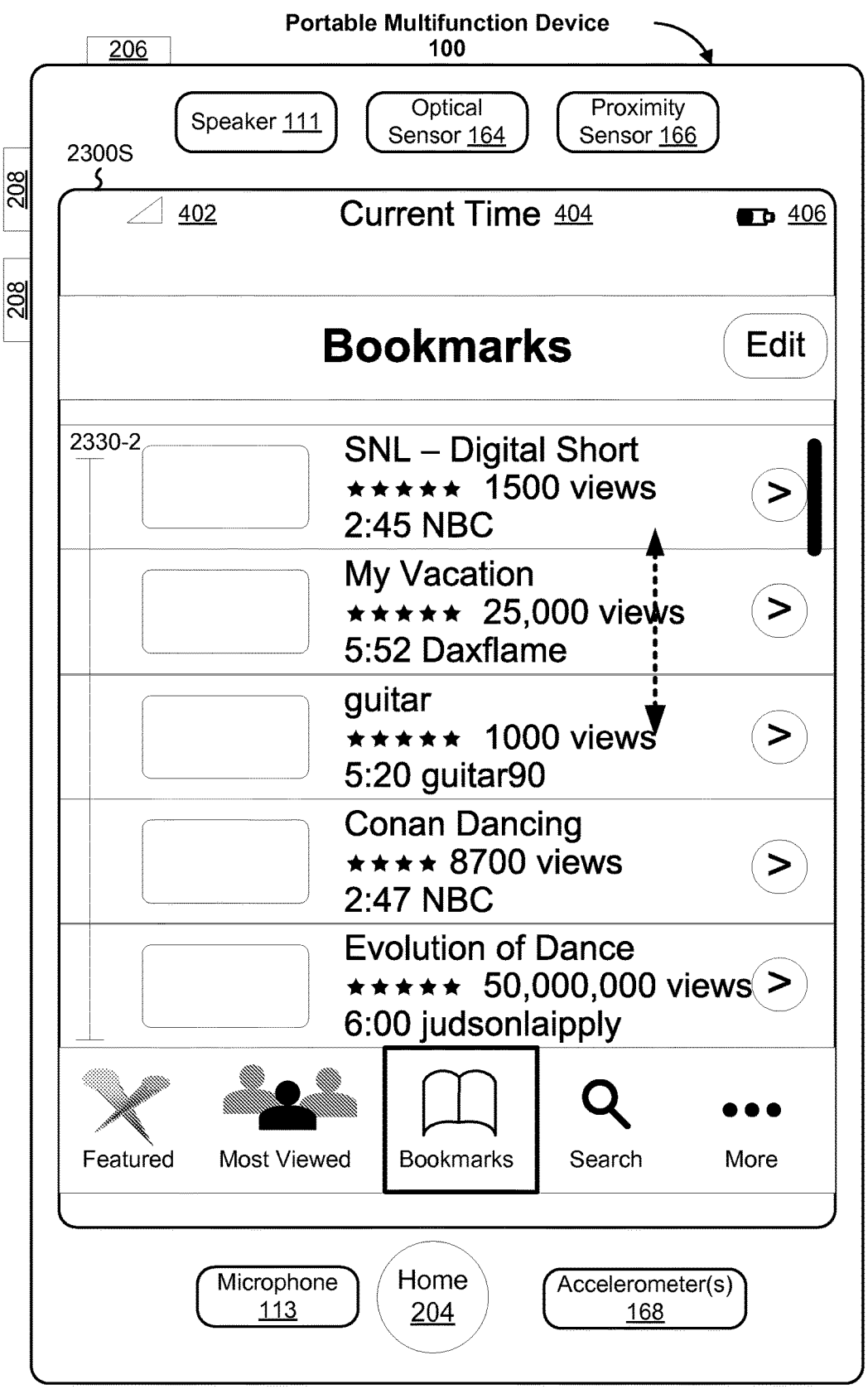
Figure 5P:
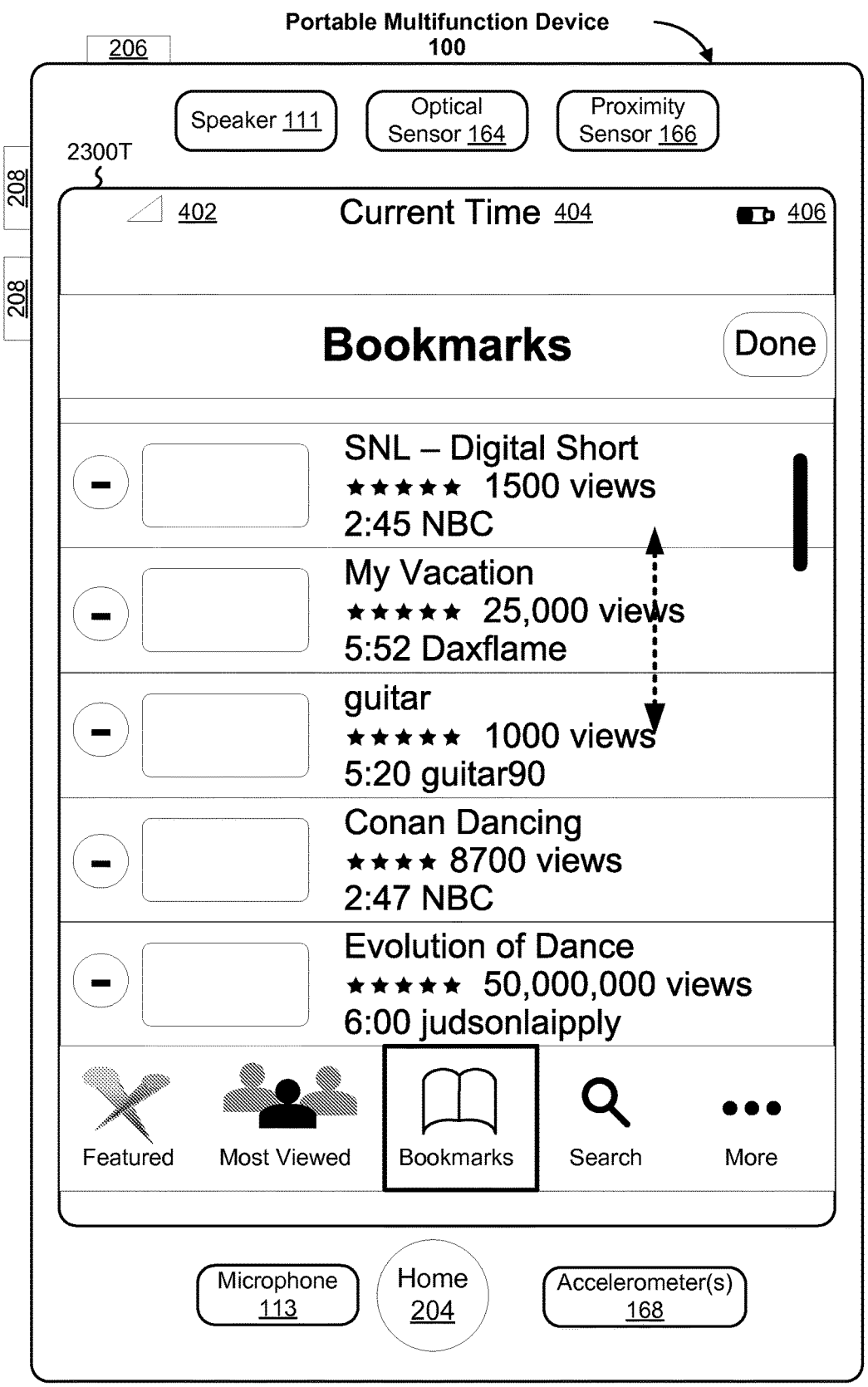

FIGS. 5A-5P illustrate exemplary user interfaces for an online video application for a portable multifunction device in accordance with some embodiments.

In some embodiments, a computer-implemented method is performed at a portable electronic device (e.g., 100) with a touch screen display 112.

The device displays a first list 2330-1 (FIG. 5A) of information about online video items in a plurality of lists 2330 of information about online video items. In some embodiments, the plurality of lists of information about online video items include at least two of: a list of information about featured content items (e.g., videos featured by the online video website), a list of information about most recently added content items (e.g., videos most recently added to the online video website), a list of information about most viewed content items (e.g., videos most viewed by other users of the online video website, 2330-1, FIG. 5A), a list of information about top rated content items (e.g., videos rated by other users of the online video website), a list of information about content items bookmarked by a user of the computing device (e.g., bookmark list 2330-2, FIG. 5O), and a list of information about content items viewed by a user of the computing device (e.g., a list with a history of the video played by the user). In some embodiments, a respective list 2330 of information about online video items is displayed in a portrait orientation of the touch screen display. In some embodiments, in response to activation of a time window icon (e.g., all 2390, today 2392, or this week 2394 icons in FIG. 5A) a respective list may be chosen to correspond to a specific time period.

The device displays a plurality of icons (e.g., 2332-1, 2332-2, and 2332-3, FIG. 5A) corresponding to at least some of the plurality of lists of information about online video items. The plurality of icons are displayed at the same time as a list of information about online video items (e.g., list 2330-1, FIG. 5A).

In some embodiments, the device displays a search icon 2334 that when activated initiates the display of a user interface 2300R (FIG. 5N) for searching for online video items.

In response to detecting a moving finger gesture 2336 on the first list of information about content items, the device scrolls the first list of information about content items.

In response to detecting a stationary finger contact on a first portion 2338 of a row 2340 in the first list of information about online video items, wherein the row contains information about a particular online video item, the device: initiates a request for the particular online video item 2342 from a remote computer (e.g., an online video server for a web site such as www.youtube.com), receives the particular online video item 2342, and plays the particular online video item 2342 (FIG. 5B). In some embodiments, the first portion 2338 of a row includes anywhere in the row except a second portion of the row, such as additional information icon 2344.

In some embodiments, the row 2340 has a width, the touch screen 112 has a width and the width of the row is substantially the same as the width of the touch screen display (e.g., at least 90% of the width of the touch screen display). In some embodiments, the touch screen display 112 has an area and the particular online video item 2342 uses substantially all (e.g., at least 90%) of the touch screen display area when the particular online video item is played. In some embodiments, the particular online video item 2342 is played in a landscape orientation of the touch screen display (FIG. 5B).

In some embodiments, in response to detecting a finger contact 2346 (FIG. 5B) on the touch screen display while the particular online video item 2342 is playing, the device displays one or more playback controls. In some embodiments, the one or more playback controls comprise a play icon 2304, a pause icon (not shown, which may toggle with the play icon 2304), a sound volume icon 2324, and/or a playback progress bar icon 2310. In some embodiments, displaying one or more playback controls comprises displaying one or more playback controls on top of the particular online video item 2342 (e.g., a semi-transparent "heads-up display", as illustrated in FIG. 5B).

In some embodiments, while playing the particular online video item 2342, the device ceases to display the one or more playback controls. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, in response to detecting a finger contact 2346 on the touch screen display while the particular online video item is playing, the device displays a bookmark icon 2350 that, if activated by another finger contact 2348, bookmarks the particular online video item 2342 (or initiates a process for creating a bookmark for the item).

In some embodiments, in response to detecting a finger contact 2346 on the touch screen display while the particular online video item is playing, the device displays a sharing icon 2352 that, if activated by another finger contact 2354, initiates creation of an electronic message to another user that includes a link to the particular online video item. In some embodiments, in response to detecting a finger contact 2346 on the touch screen display while the particular online video item is playing, the device displays a sharing icon 2352 that, if activated by another finger contact 2354, initiates creation of an electronic message to another user that includes an online address (e.g., a URL such as "http://www.youtube.com/watch?v=1xXNoB3t8vM" in FIG. 5E) for the particular online video item. In some embodiments, the electronic message is an email (FIG. 5E). In some embodiments, the electronic message is an instant message, such as an SMS message.

In response to detecting a finger contact on a respective icon (e.g., icon 2332-1, FIG. 5A or 2332-2, FIG. 5A) in the plurality of icons, the device displays a corresponding list (e.g., 2330-1, FIG. 5A or 2330-2, FIG. 5O, respectively) of information about online video items.

In some embodiments, in response to detecting a finger contact on a second portion of the row in the first list of information about online video items (e.g., a contact on icon 2344-3, FIG. 5A), the device displays additional information about the particular online video item (e.g., UI 2300G, FIG. 5C). The second portion (e.g., icon 2344) of the row is different from the first portion 2338 of the row (e.g., anywhere else in the row 2340 besides icon 2344). In some embodiments, the additional information about the particular online video item includes information about related online video items 2356 (FIG. 5D). In some embodiments, in response to detecting a finger contact on the second portion of the row, the device displays a bookmark icon 2358 that, if activated by another finger contact 2360, bookmarks the particular online video item (or initiates a process for creating a bookmark). In some embodiments, in response to detecting a finger contact on the second portion of the row, the device displays a sharing icon 2362 that, if activated by another finger contact 2364, initiates creation of an electronic message to another user that includes a link to (or an online address for) the particular online video item (FIG. 5E). In some embodiments, in response to detecting a finger contact on the second portion of the row, the device: (a) displays a bookmark icon 2358 and a sharing icon 2362 if the particular online video item is not bookmarked (FIG. 5C), and (b) displays an enlarged sharing icon 2366 (FIG. 5D) without the bookmark icon if the particular online video item is already bookmarked (FIG. 5D).

In some embodiments, the device displays an icon 2368 (FIG. 5A) that when activated initiates the display of: (a) icons corresponding to at least some of the plurality of lists of information about online video items (e.g., 2332-4, 2332-5, 2332-6, FIG. 5F), and (b) a configuration icon (e.g., Edit icon 2370, FIG. 5F) that when activated initiates the display of a user interface 2300K (FIG. 5G) for configuring which icons corresponding to at least some of the plurality of lists are displayed with the first list of information. In some embodiments, after detecting a gesture on the configuration icon 2370, the device: detects a finger-down event 2372 (FIG. 5H) at a first icon in a plurality of icons; detects one or more finger-dragging events 2374 on the touch screen display; moves the first icon on the touch screen display along a path determined by the finger-dragging events until the first icon at least in part overlaps a second icon in the plurality of icons (e.g., in FIG. 5I, "Most Recent" icon partially overlaps "Most Viewed" icon); detects a finger-up event 2376 at the second icon; and visually replaces the second icon with the first icon (e.g., in FIG. 5J, "Most Recent" icon visually replaces the "Most Viewed" icon in FIG. 5I). In some embodiments, while moving the first icon on the touch screen display, the device displays the first icon in a manner visually distinguishable from other icons on the touch screen display (e.g., the "Most Recent" icon is enlarged in FIG. 5I). As shown in FIGS. 5K-5M, an analogous finger down, finger drag, and finger up process may be used to rearrange the icons 2332 (and 2334) that are displayed with the first list of information (e.g., exchanging the positions of the "Most Recent" icon and the "Bookmarks" icon).

In some embodiments, in response to detecting a finger contact on a playback completion icon 2314 (FIG. 5B), the device ceases to play the particular online video item 2342, and displays again the first list of information 2330-1 (FIG. 5A). In some embodiments, the finger contact detected on the playback completion icon comprises a tap gesture.

A graphical user interface 2300E (FIG. 5A) on a portable electronic device 100 with a touch screen display 112 includes: a first list 2330-1 of information about online video items in a plurality of lists of information about online video items; and a plurality of icons 2332 corresponding to at least some of the plurality of lists of information about online video items. In response to detecting a finger contact on a first portion 2338 of a row 2340 in the first list 2330-1 of information about online video items, wherein the row contains information about a particular online video item: a request is initiated for the particular online video item 2342 from a remote computer, the particular online video item 2342 is received, and the particular online video item 2342 is played. In some embodiments, in response to detecting a finger contact on a second portion of the row (e.g., additional information icon 2344) in the first list of information about online video items, wherein the second portion of the row is different from the first portion of the row, additional information is displayed about the particular online video item (e.g., in UI 2300G, FIG. 5C). In response to detecting a finger contact on a respective icon 2332 in the plurality of icons, a corresponding list 2330 of information about online video items is displayed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a touch screen display:
   displaying, on the touch screen display of the portable electronic device, a first list of information about online video items in a plurality of lists of information about online video items;
   displaying, on the touch screen display of the portable electronic device, a plurality of icons corresponding to at least some of the plurality of lists of information about online video items;
   in response to detecting a moving finger gesture on the first list of information about online video items, scrolling the first list of information about online video items on the touch screen display of the portable electronic device;

in response to detecting a tap gesture on a first portion of a row in the first list of information about online video items, wherein the row contains information about a particular online video item:
    initiating a request for the particular online video item from a remote computer,
    receiving the particular online video item, and
    playing the particular online video item;
in response to detecting a finger gesture on a second portion of the row in the first list of information about online video items, wherein the second portion of the row is different from the first portion of the row, displaying, on the touch screen display of the portable electronic device, additional information about the particular online video item; and
in response to detecting a finger gesture on a respective icon in the plurality of icons, displaying, on the touch screen display of the portable electronic device, a corresponding list of information about online video items.

2. A method, comprising:
at a portable electronic device with a touch screen display:
    displaying, on the touch screen display of the portable electronic device, a first list of information about online video items in a plurality of lists of information about online video items;
    displaying, on the touch screen display of the portable electronic device, a plurality of icons corresponding to at least some of the plurality of lists of information about online video items;
    in response to detecting a moving finger gesture on the first list of information about online video items, scrolling the first list of information about online video items on the touch screen display of the portable electronic device;
    in response to detecting a tap gesture on a first portion of a row in the first list of information about online video items, wherein the row contains information about a particular online video item:
        initiating a request for the particular online video item from a remote computer,
        receiving the particular online video item, and
        playing the particular online video item; and
    in response to detecting a finger gesture on a respective icon in the plurality of icons, displaying, on the touch screen display of the portable electronic device, a corresponding list of information about online video items.

3. The method of claim 2, wherein, in response to detecting a finger gesture on a second portion of the row in the first list of information about online video items, wherein the second portion of the row is different from the first portion of the row, displaying additional information about the particular online video item.

4. The method of claim 3, wherein the additional information about the particular online video item includes information about related online video items.

5. The method of claim 3, wherein
in response to detecting a finger gesture on the second portion of the row, displaying a bookmark icon that, if activated by another finger gesture, bookmarks the particular online video item.

6. The method of claim 3, wherein
in response to detecting a finger gesture on the second portion of the row, displaying a sharing icon that, if activated by another finger gesture, initiates creation of an electronic message to another user that includes a link to or an online address for the particular online video item.

7. The method of claim 3, wherein
in response to detecting a finger gesture on the second portion of the row,
    displaying a bookmark icon and a sharing icon if the particular online video item is not bookmarked, and
    displaying an enlarged sharing icon without the bookmark icon if the particular online video item is already bookmarked.

8. The method of claim 2, wherein the plurality of lists of information about online video items include at least two of: a list of information about featured online video items, a list of information about most recently added online video items, a list of information about most viewed online video items, a list of information about top rated online video items, a list of information about online video items bookmarked by a user of the computing device, and a list of information about online video items viewed by a user of the computing device.

9. The method of claim 2, wherein a respective list of information about online video items is displayed in a portrait orientation of the touch screen display.

10. The method of claim 2, wherein the row has a width, the touch screen has a width and the width of the row is substantially the same as the width of the touch screen display.

11. The method of claim 2, wherein the touch screen display has an area and the particular online video item uses substantially all of the touch screen display area when the particular online video item is played.

12. The method of claim 2, including displaying a search icon that when activated initiates the display of a user interface for searching for online video items.

13. The method of claim 2, including displaying an icon that when activated initiates the display of:
    icons corresponding to at least some of the plurality of lists of information about online video items, and
    a configuration icon that when activated initiates the display of a user interface for configuring which icons corresponding to at least some of the plurality of lists are displayed with the first list of information.

14. The method of claim 13, wherein
after detecting a gesture on the configuration icon,
    detecting a finger-down event at a first icon in a plurality of icons;
    detecting one or more finger-dragging events on the touch screen display;
    moving the first icon on the touch screen display along a path determined by the finger-dragging events until the first icon at least in part overlaps a second icon in the plurality of icons;
    detecting a finger-up event at the second icon; and
    visually replacing the second icon with the first icon.

15. The method of claim 14, wherein while moving the first icon on the touch screen display, displaying the first icon in a manner visually distinguishable from other icons on the touch screen display.

16. The method of claim 2, wherein the particular online video item is played in a landscape orientation of the touch screen display.

17. The method of claim 2, wherein
in response to detecting a finger gesture on the touch screen display while the particular online video item is playing, displaying one or more playback controls.

18. The method of claim 17, wherein the one or more playback controls comprise a play icon, a pause icon, a sound volume icon, and/or a playback progress bar icon.

19. The method of claim 17, wherein displaying one or more playback controls comprises displaying one or more playback controls on top of the particular online video item.

20. The method of claim 17, including, while playing the particular online video item, ceasing to display the one or more playback controls.

21. The method of claim 20, wherein ceasing to display the one or more playback controls comprises fading out the one or more playback controls.

22. The method of claim 20, wherein the display of the one or more playback controls is ceased after a predetermined time.

23. The method of claim 20, wherein the display of the one or more playback controls is ceased after no contact is detected with the touch screen display for a predetermined time.

24. The method of claim 2, wherein
in response to detecting a finger gesture on the touch screen display while the particular online video item is playing, displaying a bookmark icon that, if activated by another finger gesture, bookmarks the particular online video item.

25. The method of claim 2, wherein
in response to detecting a finger gesture on the touch screen display while the particular online video item is playing, displaying a sharing icon that, if activated by another finger gesture, initiates creation of an electronic message to another user that includes a link to the particular online video item.

26. The method of claim 2, wherein
in response to detecting a finger gesture on the touch screen display while the particular online video item is playing, displaying a sharing icon that, if activated by another finger gesture, initiates creation of an electronic message to another user that includes an online address for the particular online video item.

27. The method of claim 2, wherein
in response to detecting a finger gesture on a playback completion icon,
ceasing to play the particular online video item, and
displaying again the first list of information.

28. The method of claim 27, wherein the finger gesture detected on the playback completion icon comprises a tap gesture.

29. A graphical user interface on a portable electronic device with a touch screen display, comprising:
a first list of information about online video items in a plurality of lists of information about online video items; and
a plurality of icons corresponding to at least some of the plurality of lists of information about online video items;
wherein:
in response to detecting a finger gesture on a first portion of a row in the first list of information about online video items, wherein the row contains information about a particular online video item:
a request is initiated for the particular online video item from a remote computer,
the particular online video item is received, and
the particular online video item is played; and
in response to detecting a finger gesture on a respective icon in the plurality of icons, a corresponding list of information about online video items is displayed.

30. The graphical user interface of claim 29, wherein:
in response to detecting a finger gesture on a second portion of the row in the first list of information about online video items, wherein the second portion of the row is different from the first portion of the row, additional information is displayed about the particular online video item.

31. A portable computing device, comprising:
a touch screen display;
one or more processors;
memory; and
one or more programs, wherein the one or more programs are stored in the memory and configured to be executed by the one or more processors, the one or more programs including:
instructions for displaying a first list of information about online video items in a plurality of lists of information about online video items;
instructions for displaying a plurality of icons corresponding to at least some of the plurality of lists of information about online video items;
instructions for, in response to detecting a moving finger gesture on the first list of information about online video items, scrolling the first list of information about online video items;
instructions for, in response to detecting a tap gesture on a first portion of a row in the first list of information about online video items, wherein the row contains information about a particular online video item:
initiating a request for the particular online video item from a remote computer,
receiving the particular online video item, and
playing the particular online video item; and
instructions for, in response to detecting a finger gesture on a respective icon in the plurality of icons, displaying a corresponding list of information about online video items.

32. A non-transitory computer readable storage medium storing one or more programs, the one or more programs comprising instructions, which when executed by a portable computing device with a touch screen display, cause the device to:
display a first list of information about online video items in a plurality of lists of information about online video items;
display a plurality of icons corresponding to at least some of the plurality of lists of information about online video items;
in response to detecting a moving finger gesture on the first list of information about online video items, scroll the first list of information about online video items;
in response to detecting a tap gesture on a first portion of a row in the first list of information about online video items, wherein the row contains information about a particular online video item:
initiate a request for the particular online video item from a remote computer,
receive the particular online video item, and
play the particular online video item; and
in response to detecting a finger gesture on a respective icon in the plurality of icons, display a corresponding list of information about online video items.

* * * * *

UNITED STATES PATENT AND TRADEMARK OFFICE
CERTIFICATE OF CORRECTION

PATENT NO. : 9,933,937 B2  
APPLICATION NO. : 11/968067  
DATED : April 3, 2018  
INVENTOR(S) : Lemay et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3015 days.

Signed and Sealed this
Fourth Day of September, 2018

Andrei Iancu
*Director of the United States Patent and Trademark Office*